(12) United States Patent
Asada et al.

(10) Patent No.: US 11,966,087 B2
(45) Date of Patent: Apr. 23, 2024

(54) FERRULE STRUCTURE, METHOD FOR MANUFACTURING FERRULE STRUCTURE, FERRULE, AND LENS UNIT

(71) Applicant: FUJIKURA LTD., Tokyo (JP)

(72) Inventors: Hirotaka Asada, Chiba (JP); Akihiro Nakama, Chiba (JP); Akito Nishimura, Chiba (JP); Takahiko Sabano, Chiba (JP)

(73) Assignee: Fujikura Ltd., Tokyo (JP)

( * ) Notice: Subject to any disclaimer, the term of this patent is extended or adjusted under 35 U.S.C. 154(b) by 364 days.

(21) Appl. No.: 17/415,463

(22) PCT Filed: Oct. 3, 2019

(86) PCT No.: PCT/JP2019/039033
§ 371 (c)(1),
(2) Date: Jun. 17, 2021

(87) PCT Pub. No.: WO2020/129354
PCT Pub. Date: Jun. 25, 2020

(65) Prior Publication Data
US 2022/0075124 A1 Mar. 10, 2022

(30) Foreign Application Priority Data

Dec. 20, 2018 (JP) ................. 2018-238361
Dec. 25, 2018 (JP) ................. 2018-240665

(51) Int. Cl.
*G02B 6/38* (2006.01)
*G02B 6/32* (2006.01)
*G02B 6/40* (2006.01)

(52) U.S. Cl.
CPC ............. *G02B 6/3838* (2013.01); *G02B 6/32* (2013.01); *G02B 6/3853* (2013.01);
(Continued)

(58) Field of Classification Search
CPC ...... G02B 6/3838; G02B 6/32; G02B 6/3853; G02B 6/3861; G02B 6/40
(Continued)

(56) References Cited

U.S. PATENT DOCUMENTS 8,038,354 B2 10/2011 Nielson et al.
2006/0083514 A1* 4/2006 Liu ................... G02B 6/4246
398/85
(Continued)

FOREIGN PATENT DOCUMENTS

CN 102346276 A 2/2012
CN 102540348 A 7/2012
(Continued)

OTHER PUBLICATIONS

International Search Report and Written Opinion issued in corresponding International Patent Application No. PCT/JP2019/039033 dated Nov. 26, 2019 (14 pages).

*Primary Examiner* — Jerry M Blevins
(74) *Attorney, Agent, or Firm* — Osha Bergman Watanabe & Burton LLP

(57) ABSTRACT

A ferrule structure includes a ferrule including a plurality of unit holes, and a plurality of lens units, wherein each lens unit includes a lens part attached to an end part of an optical fiber, and each lens unit is molded from a resin for transmittance an optical signal, and each lens unit is to be inserted in one of the unit holes.

7 Claims, 18 Drawing Sheets

(52) U.S. Cl.
CPC ......... *G02B 6/3861* (2013.01); *G02B 6/3885* (2013.01); *G02B 6/40* (2013.01)

(58) Field of Classification Search
USPC .......................................................... 385/65
See application file for complete search history.

(56) References Cited

U.S. PATENT DOCUMENTS

| | | | |
|---|---|---|---|
| 2016/0202430 A1 | 7/2016 | de Jong et al. | |
| 2020/0088954 A1* | 3/2020 | Nakama | G02B 6/40 |

FOREIGN PATENT DOCUMENTS

| | | |
|---|---|---|
| CN | 203732759 U | 7/2014 |
| CN | 104169765 A | 11/2014 |
| CN | 108700715 A | 10/2018 |
| JP | S61-169804 A | 7/1986 |
| JP | 2003-344702 A | 12/2003 |
| JP | 2007-241093 A | 9/2007 |
| JP | 2010-164708 A | 7/2010 |
| JP | 2014-66807 A | 4/2014 |
| JP | 2014-521996 A | 8/2014 |
| JP | 2015-111199 A | 6/2015 |
| WO | 2017/141904 A1 | 8/2017 |
| WO | 2018/037958 A1 | 3/2018 |
| WO | 2018/089286 A1 | 5/2018 |

* cited by examiner

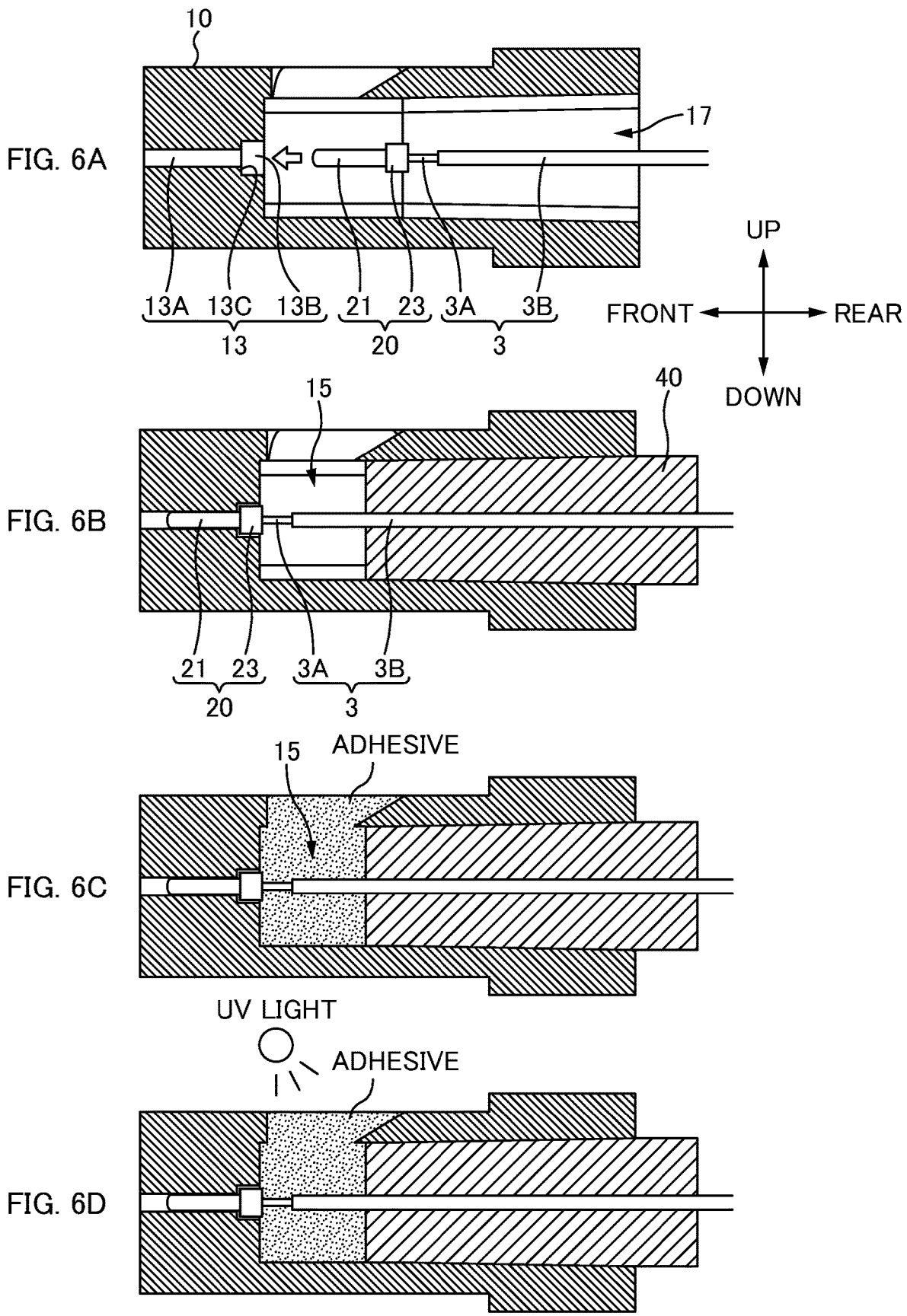

FERRULE STRUCTURE, METHOD FOR MANUFACTURING FERRULE STRUCTURE, FERRULE, AND LENS UNIT

TECHNICAL FIELD

The present invention relates to a ferrule structure, a method for manufacturing a ferrule structure, a ferrule, and a lens unit.

BACKGROUND

A technique for optically connecting optical fibers to each other by causing ferrules each including lenses on an end face of a lens barrel to face each other has been known. Patent Literatures 1 and 2 describe a structure including a ferrule body including a plurality of fiber holes, and a lens array (lens plate) including a plurality of lenses.

PATENT LITERATURE

Patent Literature 1: JP 2014-521996A
Patent Literature 2: WO2018/089286

In the structure described in Patent Literature 1, the ferrule body and the lens array (lens plate) are aligned with each other by a guide pin, and thus alignment between each optical fiber and the lens is performed. However, in the structure in Patent Literature 1, in order for each of the multitude of lenses of the lens array to have a desired positional relationship with the optical fiber of the ferrule body, the ferrule body and the lens array need to be molded with high precision, and an assembly error of the ferrule body and the lens array also needs to be suppressed. As a result, manufacturing is difficult (or a manufacturing cost increases).

On the other hand, in the structure described in Patent Literature 2, the lens plate includes a plurality of alignment sockets corresponding to the lenses. Then, by inserting an end part of the optical fiber into the alignment socket, each of the multitude of lenses has a desired positional relationship with the optical fiber. However, the lens plate in Patent Literature 2 has a complicated structure, and thus manufacturing is difficult.

SUMMARY

One or more embodiments provide a ferrule structure comprising lens units with optical fibers.

A ferrule structure according to one or more embodiments comprises: a ferrule including a plurality of unit holes; and a plurality of lens units, wherein the lens unit includes a lens part, is attached to an end part of an optical fiber, and is molded from a resin capable of transmitting an optical signal, and the lens unit is configured to be inserted in each of the unit holes.

A ferrule structure according to one or more embodiments comprises: a ferrule including a plurality of fiber holes; and a plurality of lens parts, wherein a lens housing part is formed on a front side of each of the fiber holes, and the lens part is housed in each of a plurality of the lens housing parts.

Other features of the invention are made clear by the following description and the drawings.

One or more embodiments of the invention make it possible to attach lens units to optical fibers with high precision.

BRIEF DESCRIPTION OF DRAWINGS

FIGS. 6A, 6B, 6C, and 6D are explanatory views of a method for manufacturing the ferrule structure 1.

DETAILED DESCRIPTION

Figure 1A:
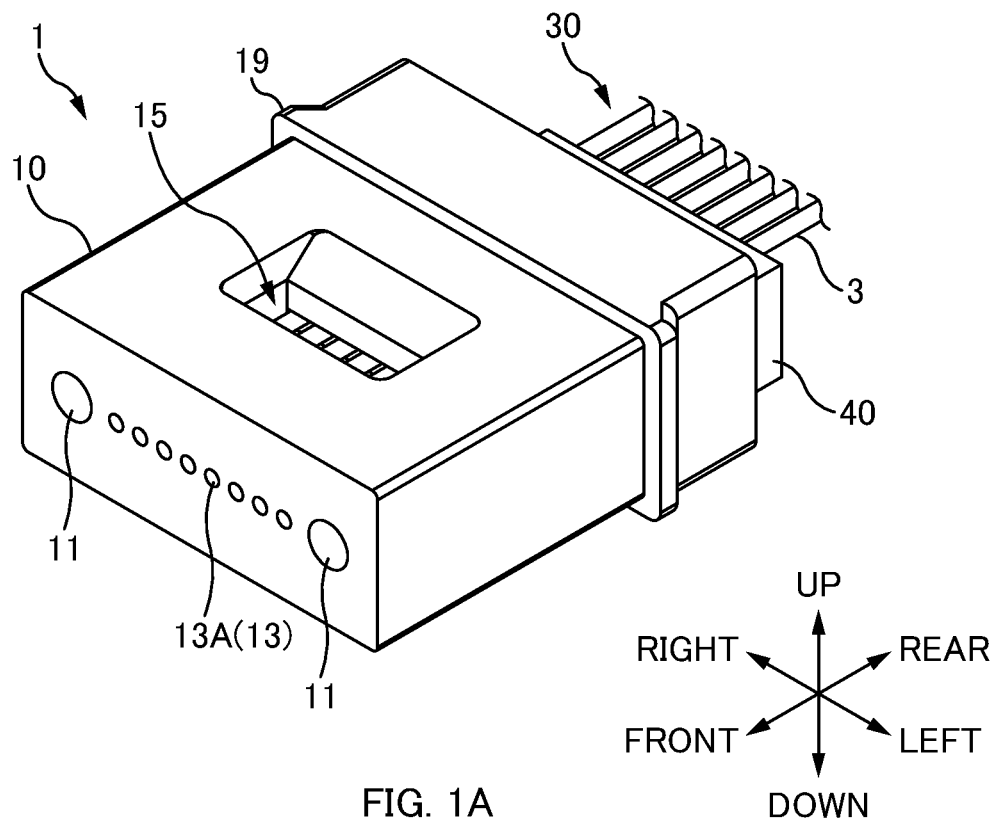
FIG. 1A is a general perspective view of a ferrule structure 1 according to a first embodiment.

At least the following matters are made clear from the following description and the drawings.

(1)

A ferrule structure will become clear, comprising: a ferrule including a plurality of unit holes; and a plurality of lens units, wherein the lens unit includes a lens part, is attached to an end part of an optical fiber, and is molded from a resin capable of transmitting an optical signal, and the lens unit is configured to be inserted in each of the unit holes. With this ferrule structure, the lens part of the lens unit having a simple structure and the optical fiber may be aligned one-to-one, and thus highly precise alignment between the optical fiber and the lens part can be achieved. Since the lens part expands a diameter of an optical signal, a position error of the unit hole of the ferrule is tolerated. Thus, manufacturing the ferrule is also easy (or cost effective). Thus, the lens part can be arranged with respect to each of the plurality of optical fibers with high precision with a simple structure.

In one or more embodiments, a tip of the lens part is arranged inside the unit hole. In this way, it is possible to suppress damage to the lens part.

In one or more embodiments, a recessed part is formed in an end face of the ferrule, an opening of the unit hole is formed in a bottom surface of the recessed part, and a tip of the lens part protrudes forward from the opening of the unit hole, and is also arranged closer to a rear side than the end face of the ferrule. In this way, it is possible to suppress damage to the lens part.

In one or more embodiments, the unit hole includes a step part, the lens unit includes a flange part, and the flange part comes in contact with the step part. In this way, the lens unit can be aligned with the ferrule (unit hole) in an optical axis direction of the optical fiber.

In one or more embodiments, a positioning part is formed on each of the unit hole and the flange part, and the positioning part of each of the unit hole and the flange part performs alignment in a rotation direction about an optical axis of the optical fiber. In this way, alignment in the rotation direction can be easily and reliably performed.

In one or more embodiments, an end face of the optical fiber is inclined with respect to a plane perpendicular to the optical axis. In this way, a loss of an optical signal can be reduced.

In one or more embodiments, the lens unit includes a fiber hole for insertion of the optical fiber, an abutment surface for abutment of the optical fiber is formed in an end part of the fiber hole, and the abutment surface is inclined with respect to the plane perpendicular to the optical axis. In this way, a return loss can be reduced (reflected return light can be suppressed, and an adverse effect on a light source element can be prevented).

A method for manufacturing a ferrule structure will become clear, the method comprising: preparing a plurality of lens units that include a lens part, are each attached to an end part of an optical fiber, and are each molded from a resin capable of transmitting an optical signal; and inserting and fixing, to each unit hole of a ferrule including a plurality of unit holes, each of the lens units to which the optical fiber is attached. With this method for manufacturing a ferrule structure, the lens part is provided on the lens unit attached to the end part of the optical fiber, and thus it is possible to arrange the lens part with respect to each of the plurality of optical fibers with high precision.

The method may further comprise forming the lens unit to which the optical fiber is attached by inserting the optical fiber into a fiber hole of the lens unit, and fixing the optical fiber to the fiber hole. In this way, a restriction on a resin used for molding the lens unit can be reduced.

The method may further comprise: arranging an end part of the optical fiber in a chamber of a die that molds the lens unit with the resin; and forming the lens unit to which the optical fiber is attached by injecting the resin into the chamber. In this way, the configuration of the lens unit can be simplified.

A ferrule including a plurality of unit holes will become clear, wherein a lens unit is inserted in each of the unit holes, and the lens unit includes a lens part, is attached to an end part of an optical fiber, and is molded from a resin capable of transmitting an optical signal.

A lens unit will become clear, wherein the lens unit is attached to an end part of the optical fiber, and is inserted in each of a plurality of unit holes of a ferrule including the plurality of unit holes, and the lens unit includes a lens part, and is molded from a resin capable of transmitting an optical signal.

(2)

A ferrule structure will become clear comprising: a ferrule including a plurality of fiber holes; and a plurality of lens parts, wherein a lens housing part is formed on a front side of each of the fiber holes, and the lens part is housed in each of a plurality of the lens housing parts. With this ferrule structure, the lens part is housed (arranged) on the front side of the fiber hole for insertion of the optical fiber, and thus it is easy to align the lens part and the optical fiber one-to-one. Thus, the lens can be arranged with respect to each of the plurality of optical fibers with high precision with a simple structure.

In one or more embodiments, a tip of the lens part is arranged closer to a rear side than an end face of the ferrule. In this way, it is possible to suppress damage to the lens part.

In one or more embodiments, a recessed part is formed in the end face of the ferrule, the lens housing part is formed in a bottom surface of the recessed part, and a tip of the lens part protrudes forward from the bottom surface, and is also arranged closer to the rear side than the end face of the ferrule. In this way, it is possible to suppress damage to the lens part.

In one or more embodiments, an end face of an optical fiber is inclined with respect to a plane perpendicular to an optical axis of the optical fiber. In this way, a loss of an optical signal can be reduced.

In one or more embodiments, the lens part includes an abutment part for abutment of the end face of the optical fiber, and a section of the abutment part facing at least the end face of the optical fiber is inclined with respect to the plane perpendicular to the optical axis. In this way, a return loss can be reduced (reflected return light can be suppressed, and an adverse effect on a light source element can be prevented).

In one or more embodiments, the lens housing part includes a step part constituting a step with respect to the fiber hole, and an inner wall surface formed on an edge of the step part, and, when the lens part is housed in the lens housing part, a rear end surface of the lens part is in contact with the step part, and a side surface of the lens part is in contact with the inner wall surface. In this way, the lens part is housed in the lens housing part, and thus alignment in an optical axis direction (front-rear direction) and directions (up-down direction and left-right direction) perpendicular to an optical axis can be performed.

In one or more embodiments, a positioning part is formed on each of the inner wall surface of the lens housing part and the side surface of the lens part, and the positioning part of each of the lens housing part and the lens part performs alignment in a rotation direction about the optical axis of the optical fiber. In this way, alignment in the rotation direction of the lens part with respect to the lens housing part can be easily and reliably performed.

In one or more embodiments, the ferrule structure further comprises a coupling part configured to couple the lens parts adjacent to each other, wherein a groove part for arranging the coupling part is provided between the lens housing parts adjacent to each other of the ferrule. In this way, handling of multitude of the lens parts is easy. Alignment in the rotation direction of the multitude of the lens parts becomes easy.

A method for manufacturing a ferrule structure will become clear, comprising: preparing a ferrule including a plurality of fiber holes, and in which a lens housing part is formed on a front side of each of the fiber holes; inserting an end part of an optical fiber into the fiber hole; applying an adhesive to the inside of the lens housing part; and housing a lens part in the lens housing part.

A ferrule will become clear including a plurality of fiber holes each for insertion of an end part of an optical fiber, wherein a lens housing part is formed on a front side of each of the fiber holes, and a lens part can be housed in each of a plurality of the lens housing parts.

First Embodiment

Figure 1B:
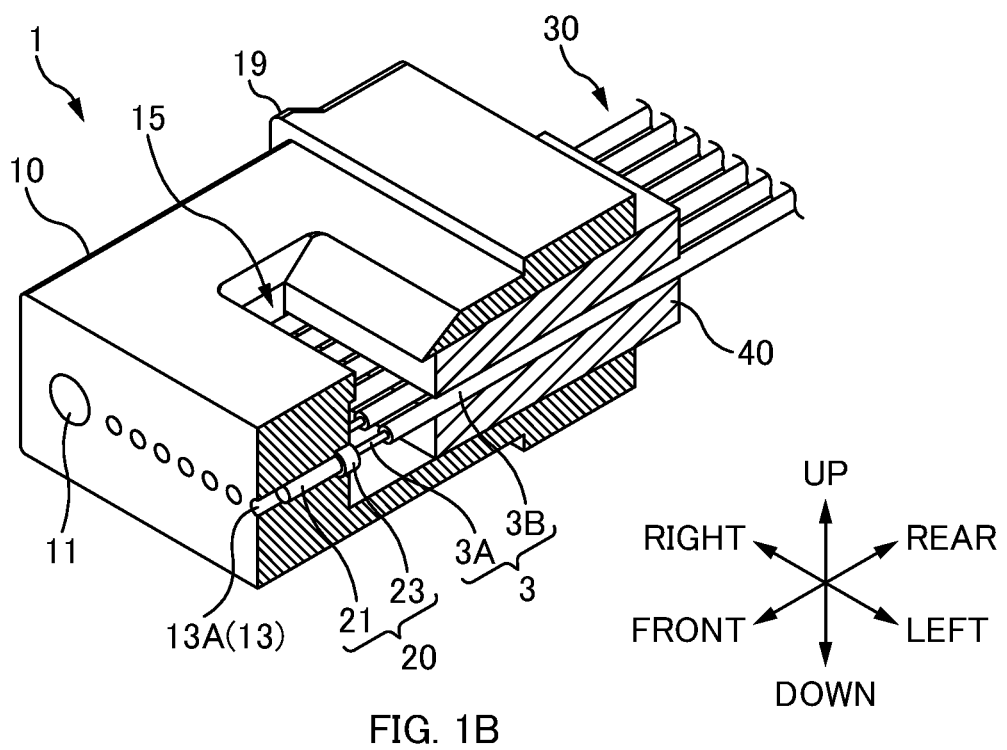
FIG. 1B is a cross-sectional perspective view of the ferrule structure 1 according to the first embodiment.
Figure 2A:
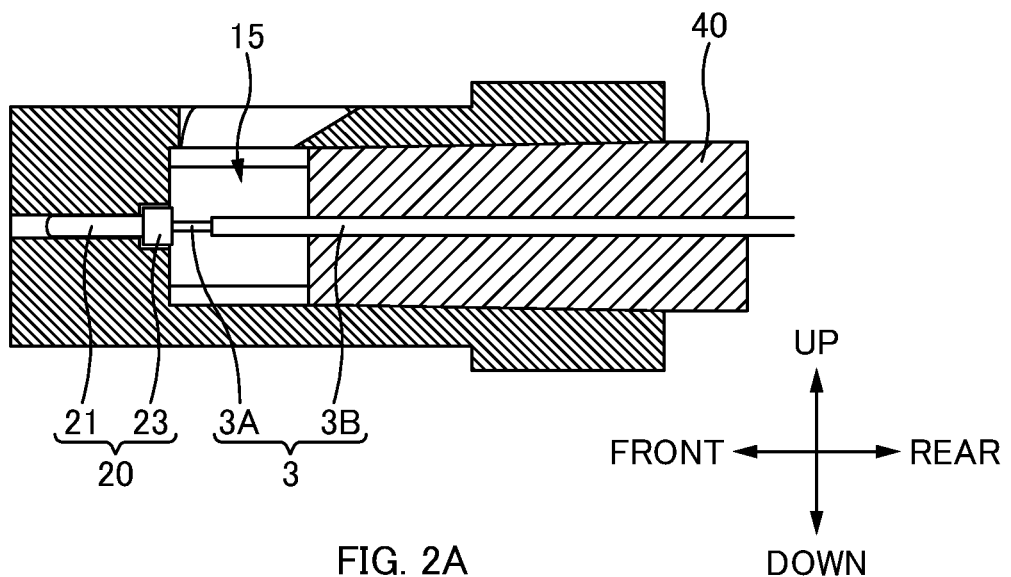
FIG. 2A is a cross-sectional view of the ferrule structure 1 according to the first embodiment.
Figure 2B:
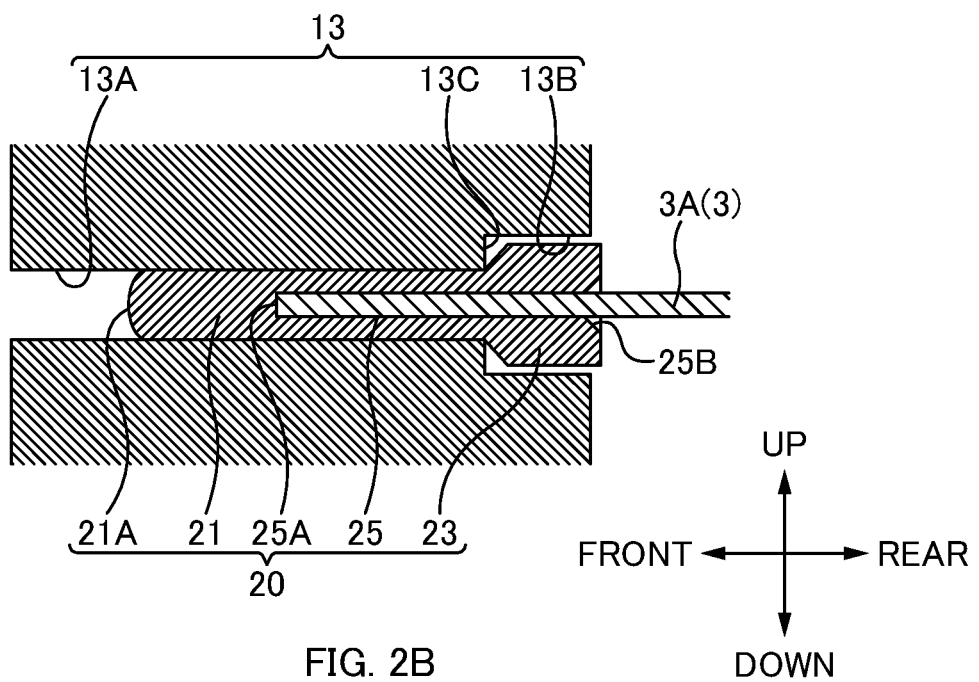
FIG. 2B is a partially enlarged perspective view of the ferrule structure 1 according to the first embodiment.
Figure 3A:
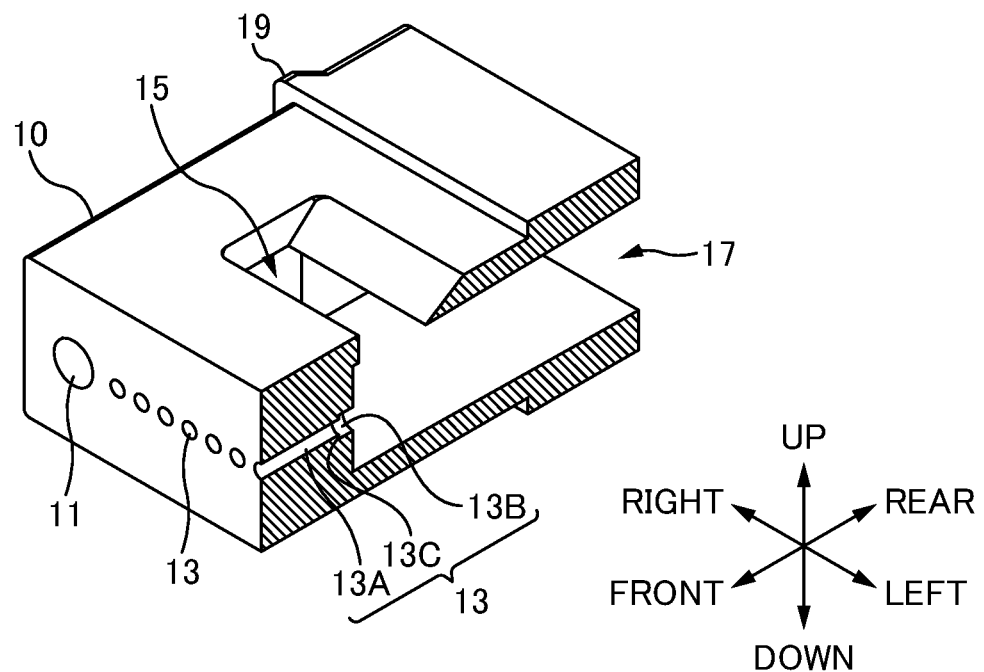
FIG. 3A is a perspective view of a ferrule 10 according to the first embodiment.
Figure 3B:
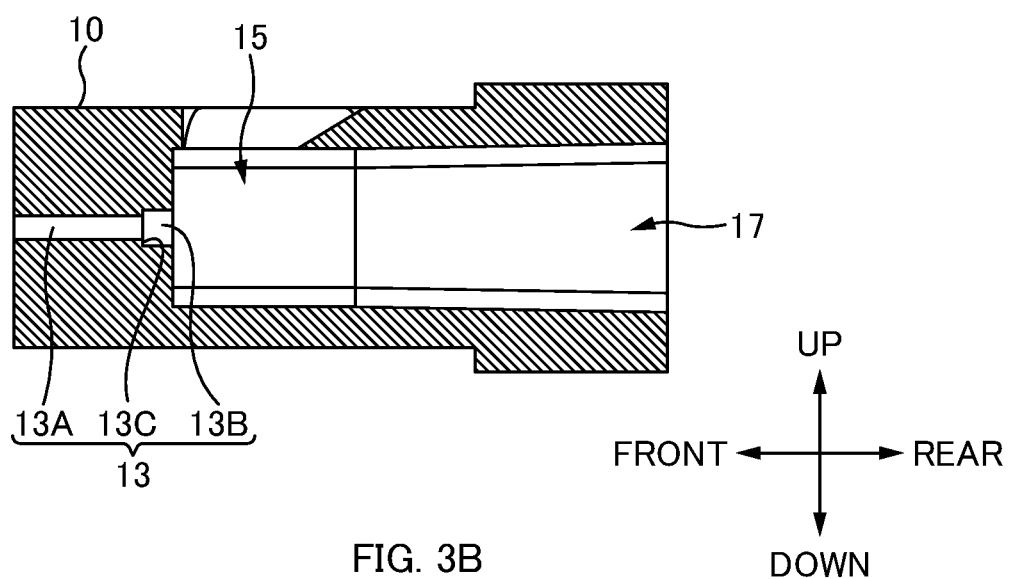
FIG. 3B is a cross-sectional view of the ferrule 10 according to the first embodiment.
Figure 4A:
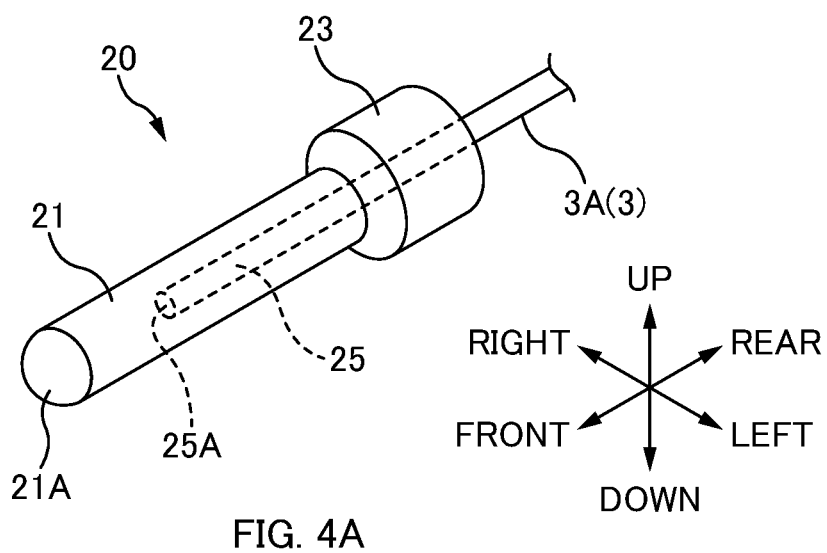
FIG. 4A is a perspective view of a lens unit 20 according to the first embodiment.
Figure 4B:
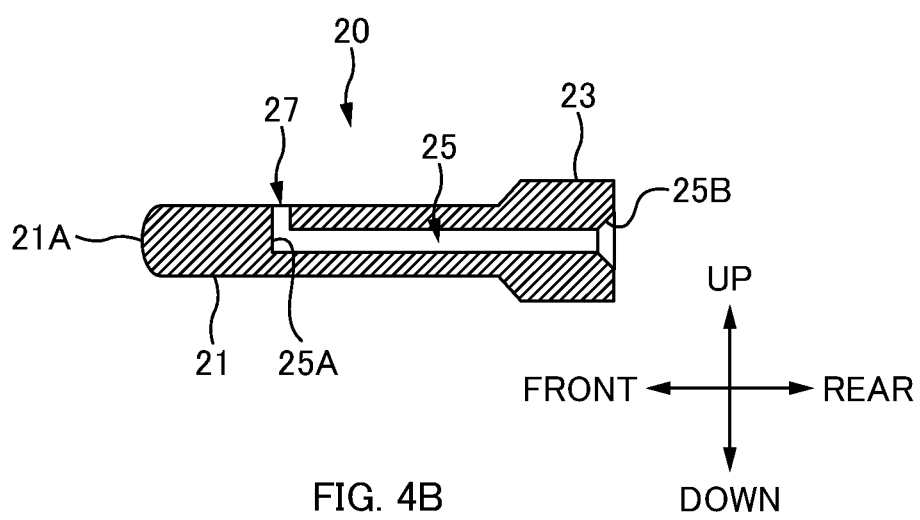
FIG. 4B is a cross-sectional view of the lens unit 20 according to the first embodiment.

FIG. 1A is a general perspective view of a ferrule structure 1 according to a first embodiment. FIG. 1B is a cross-sectional perspective view of the ferrule structure 1 according to the first embodiment. FIG. 2A is a cross-sectional view of the ferrule structure 1 according to the first embodiment. FIG. 2B is a partially enlarged perspective view of the ferrule structure 1 according to the first embodiment. FIG. 3A is a perspective view of a ferrule 10 according to the first embodiment. FIG. 3B is a cross-sectional view of the ferrule 10 according to the first embodiment. FIG. 4A is a perspective view of a lens unit 20 according to the first embodiment. FIG. 4B is a cross-sectional view of the lens unit 20 according to the first embodiment.

In the present embodiment, a "front-rear direction", a "left-right direction", and an "up-down direction" are defined as follows. The front-rear direction is an optical axis direction of an optical fiber 3, a side of an end face of the optical fiber 3 is "front", and an opposite side thereof is "rear". The left-right direction is a direction in which two guide holes 11 are aligned, when a front side is seen from a rear side, a right side is "right" and a left side is "left". The up-down direction is a direction orthogonal to the left-right direction and the front-rear direction, a side on which an opening for filling an adhesive is provided in a filling part 15 in the ferrule 10 is "up", and an opposite side is "down".

The ferrule structure 1 according to the present embodiment includes the ferrule 10, the lens unit 20, an optical fiber ribbon 30, and a boot 40.

The ferrule 10 is a member for holding an end part of the optical fiber 3 and optically connecting the optical fiber 3 to another optical component, and is, for example, a pin mating type MT ferrule. The ferrule 10 according to the present embodiment is integrally molded from a resin (for example, a transparent resin) capable of transmitting an optical signal. The ferrule 10 according to the present embodiment includes guide holes 11, unit holes 13, the filling part 15, a boot hole 17, and a flange part 19.

The guide hole 11 is a hole for insertion of a guide pin (not illustrated). The guide pin is inserted in the guide hole 11, and thus ferrules are aligned with each other. Two guide holes 11 are openings in a front end surface (connecting end face) of the ferrule 10. The two guide holes 11 are arranged at an interval in the left-right direction so as to sandwich a plurality of the unit holes 13 in the left-right direction.

The unit hole 13 is a hole for insertion of the lens unit 20 described later. The unit hole 13 is also a hole for positioning the lens unit 20. The unit hole 13 is formed so as to penetrate between the front endface of the ferrule 10 and the filling part 15 in the front-rear direction.

The plurality of unit holes 13 are formed in the ferrule 10. The plurality of unit holes 13 are aligned in the left-right direction. The lens unit 20 provided for the optical fiber 3 is inserted in each of the unit holes 13 aligned in the left-right direction. Note that, in the present embodiment, a row of the unit holes 13 aligned in the left-right directions is only one (a single row) in the up-down direction, but the present disclosure is not limited thereto. A plurality of rows may be aligned and provided in the up-down direction.

Each of the unit holes 13 includes a front hole 13A, a rear hole 13B, and a step part 13C.

The front hole 13A is a section for insertion of a body part 21 of the lens unit 20. Thus, a diameter of the front hole 13A is formed to be almost the same as a diameter of the body part 21 of the lens unit 20. Specifically, a diameter of the front hole 13A according to the present embodiment is 200 to 240 μm. The front hole 13A is provided along the front-rear direction (optical axis direction), and is open in the front endface of the ferrule 10. Then, an optical signal passes through the inside of the front hole 13A via the lens unit 20.

The rear hole 13B is a section for insertion of a flange part 23 of the lens unit 20, and is provided in a rear part (closer to a rear side than the front hole 13A) of the unit hole 13. A diameter of the flange part 23 is larger than a diameter of the body part 21 in the lens unit 20 (cf. FIG. 4), and thus a diameter of the rear hole 13B is formed larger than a diameter of the front hole 13A. The rear hole 13B communicates with the filling part 15. In this way, the lens unit 20 can be inserted in the unit hole 13 from the filling part 15 side (rear side).

The step part 13C is a section between the front hole 13A and the rear hole 13B having different diameters (a rear end of the front hole 13A and a front end of the rear hole 13B). Note that a diameter of the front hole 13A is smaller than a diameter of the flange part 23 of the lens unit 20. Thus, when the lens unit 20 is inserted into the unit hole 13, the step part 13C is in contact with the flange part 23 of the lens unit 20. In this way, the step part 13C has a function of aligning the lens unit 20 in the front-rear direction.

The filling part 15 is a hollow part to be filled with an adhesive. The filling part 15 is a hollow elongated in the left-right direction. An adhesive for keeping the optical fiber 3 in the ferrule 10 fills the filling part 15. The adhesive fills the filling part 15, and is thus applied between inner wall surfaces of the filling part 15 and the optical fiber 3. This adhesive is cured to fix the optical fiber 3 to the ferrule 10.

The boot hole 17 is provided so as to penetrate between a rear endface of the ferrule 10 and the filling part 15 in the front-rear direction. The boot hole 17 is a hole for housing and fixing the boot 40 attached to the optical fiber ribbon 30 (the plurality of optical fibers 3).

The flange part 19 is a section protruding outward from an outer surface of the ferrule 10.

The lens unit 20 (cf. FIG. 4) is a member molded from a transparent resin, and is a member to be attached to the end part of the optical fiber 3. The lens unit 20 includes the body part 21, the flange part 23, a fiber hole 25, and an air hole 27.

The body part 21 is a section constituting a body of the lens unit 20, and is formed in a rod shape having a circular cross section and being long and narrow in the front-rear direction. A lens part 21A is provided on the body part 21.

The lens part 21A is formed in a shape protruding forward at a tip (front end) part of the body part 21. The lens part 21A functions as a collimator lens. In other words, the lens part 21A has a function of emitting, as collimated light, an optical signal emitted from the optical fiber 3, and a function of converging incident collimated light and causing the collimated light to be incident on the end face of the optical fiber 3. Since the lens part 21A expands a diameter of an optical signal, a position error of the unit hole 13 of the ferrule 10 is tolerated. Thus, manufacturing the ferrule 10 is also easy (or cost effective). As illustrated in FIG. 2B, a tip of the lens part 21A is arranged inside the unit hole 13 (specifically, the front hole 13A). In this way, damage to the lens part 21A when ferrules are connected to each other and the like can be suppressed.

The flange part 23 is a section protruding outward from an outer surface of the body part 21, and is located on a rear end part of the lens unit 20 (closer to the rear side than the body part 21). As described above, since a diameter of the flange part 23 is larger than a diameter of the front hole 13A of the unit hole 13, the flange part 23 comes in contact with the step part 13C of the unit hole 13 when the lens unit 20 is inserted into the unit hole 13. In this way, alignment of the lens unit 20 with respect to the ferrule 10 (unit hole 13) in the front-rear direction can be performed.

The fiber hole 25 is a hole for insertion of the end part of the optical fiber 3 (a bare optical fiber 3A). The fiber hole 25 is formed along the front-rear direction (optical axis direction of the optical fiber 3). The fiber hole 25 includes an abutment part 25A. The abutment part 25A is a section for abutment of the end face of the optical fiber 3, and is provided in a front end part of the fiber hole 25. Note that the abutment part 25A according to the present embodiment is a surface perpendicular to the front-rear direction (optical axis direction of the optical fiber 3). The end face of the optical fiber 3 abuts the abutment part 25A of the fiber hole 25, and thus alignment of the optical fiber 3 with respect to the lens unit 20 (particularly, the lens part 21A) in the front-rear direction can be performed. A tapered surface 25B for insertion (guide) of the optical fiber 3 is located in a rear end part of the fiber hole 25 (opening in a rear end of the lens unit 20). The tapered surface 25B is formed in a tapered shape having a diameter gradually increasing toward the rear side. Such a tapered surface 25B is provided, and thus it is easy to insert the end part of the optical fiber 3 in the fiber hole 25.

The air hole 27 is a hole for releasing air inside the fiber hole 25 to the outside of the lens unit 20, and is open between the tip part of the fiber hole 25 and the outer surface (side surface) of the body part 21. By having the air hole 27, an air bubble being generated in the end face of the optical fiber 3 can be suppressed when the optical fiber 3 is inserted together with an adhesive into the fiber hole 25.

The optical fiber ribbon 30 is made by coupling (for example, intermittently coupling) the plurality of (herein, eight) optical fibers 3 in parallel. Note that illustration of a coupling member is omitted in FIG. 1.

The optical fiber 3 is a member that transmits an optical signal. As illustrated in FIG. 1, the eight optical fibers 3 are arranged (aligned) in the left-right direction in the ferrule 10. Each of the optical fibers 3 includes the bare optical fiber 3A and a sheath part 3B. In the sheath part 3B, the outside of the bare optical fiber 3A is covered with a sheath.

The boot 40 is a tubular body including a through hole through which the plurality of optical fibers 3 of the optical fiber ribbon 30 pass, and is inserted in the boot hole 17 of the ferrule 10. The boot 40 is integrally molded from an elastic body (elastomer) such as rubber and plastic, and holds the plurality of optical fibers 3 of the optical fiber ribbon 30. In such a manner, the optical fibers 3 are held via the boot 40 formed of an elastic body, and thus, even when a bending force is applied to the optical fibers 3, the boot 40 absorbs the force and can prevent an abrupt bend occurring in the optical fibers 3.

Manufacturing Method

Figure 5A:
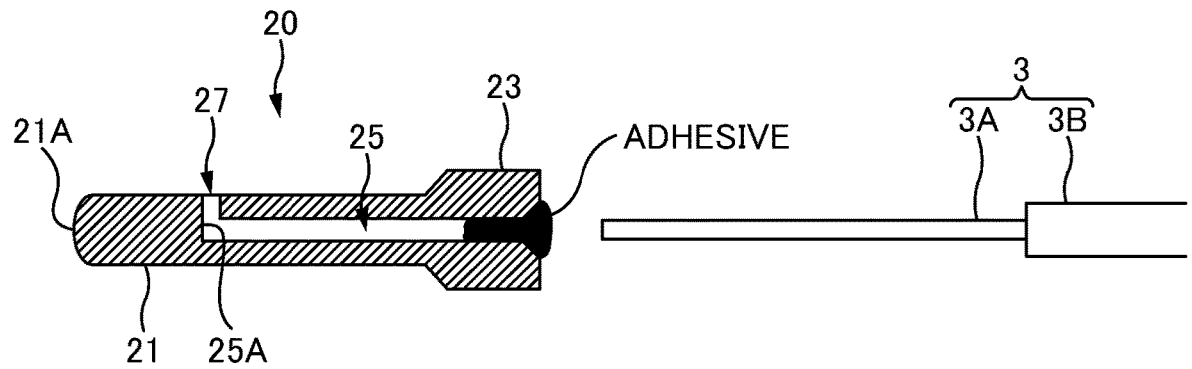
FIGS. 5A, 5B, and 5C are explanatory views of a method for attaching the lens unit 20 to an optical fiber 3.
Figure 5B:
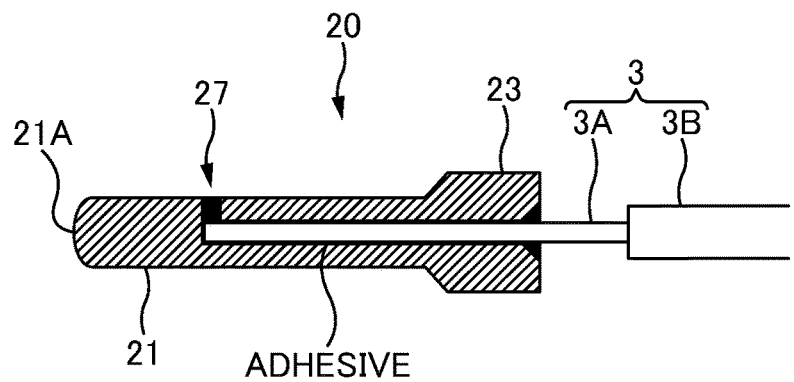
Figure 5C:
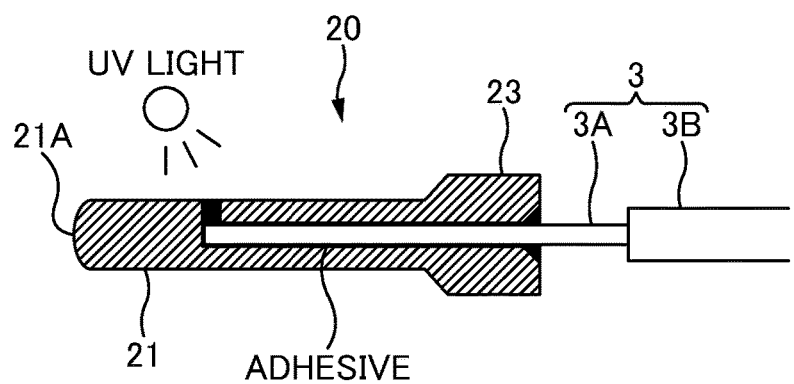

FIGS. 5A to 5C are explanatory views of a method for attaching the lens unit 20 to the optical fiber 3. Note that the plurality of lens units 20 corresponding to the plurality of optical fibers 3 of the optical fiber ribbon 30 are prepared in advance.

First, an operator performs pretreatment on the end part of each optical fiber 3. Specifically, the operator removes a sheath of the sheath part 3B of the optical fiber 3 by a determined dimension, and cuts, at a predetermined length, the optical fiber 3 (the bare optical fiber 3A) that has been removed of the sheath.

Next, as illustrated in FIG. 5A, the operator applies an adhesive (here, an ultraviolet curable adhesive (hereinafter, a UV adhesive) also serving as a refractive index matching material) to the rear end part (tapered surface 25B) of the fiber hole 25 of the lens unit 20, and inserts the optical fiber 3 into the fiber hole 25 of the lens unit 20. The optical fiber 3 is inserted together with the adhesive into the fiber hole 25. At this time, air in the fiber hole 25 is discharged from the air hole 27 to the outside of the lens unit 20.

Then, as illustrated in FIG. 5B, the end face of the optical fiber 3 abuts the abutment part 25A of the fiber hole 25. In this way, the adhesive fills between the end face of the optical fiber 3 and the abutment part 25A, between the optical fiber 3 and the fiber hole 25, and in the air hole 27. Note that, with the air hole 27, an air bubble being generated between the end face of the optical fiber 3 and the abutment part 25A can be suppressed.

Next, as illustrated in FIG. 5C, the operator irradiates the lens unit 20 with UV light (applies UV light over the transparent lens unit 20) by using an irradiator of the UV light to cure the UV adhesive. The end part of the optical fiber 3 is fixed to the lens unit 20 by curing the UV adhesive.

Similarly, the lens unit 20 is attached to the end part of each of the plurality of (here, eight) optical fibers 3 of the optical fiber ribbon 30. In such a manner, in the present embodiment, the lens unit 20 (the lens part 21A) having a simple structure and the optical fiber 3 may be aligned one-to-one, and thus highly precise alignment between the optical fiber 3 and the lens part 21A can be achieved. In other words, in the present embodiment, the lens unit 20 includes only one lens part 21A, and one optical fiber 3 is only aligned with one lens part 21A, and thus the lens unit 20 having a simple structure can achieve highly precise alignment between the optical fiber 3 and the lens part 21A.

Note that the air hole 27 may be used for filling an adhesive. In other words, while the end part of the optical fiber 3 is inserted in the fiber hole 25, and the end face of the optical fiber 3 abuts the abutment part 25A, an adhesive may fill from the air hole 27.

FIGS. 6A to 6D are explanatory views of a method for manufacturing the ferrule structure 1.

First, as illustrated in FIG. 6A, the operator inserts the lens unit 20 into each unit hole 13 of the ferrule 10, and, as illustrated in FIG. 6B, abuts the flange part 23 of the lens unit 20 against the step part 13C of the unit hole 13. In this way, alignment of the lens unit 20 with respect to the ferrule 10 (unit hole 13) in the front-rear direction is performed. The boot 40 being shifted rearward in advance is moved forward, and is inserted into the boot hole 17 of the ferrule 10.

Next, as illustrated in FIG. 6C, the operator fills an adhesive in the filling part 15. Here, a UV adhesive is filled from an opening above the filling part 15. The UV adhesive is filled in the filling part 15, and is also permeated between the unit hole 13 and the lens unit 20. Note that the UV adhesive used herein may not serve as a refractive index matching material.

Next, as illustrated in FIG. 6D, the operator irradiates the ferrule 10 with UV light (applies UV light over the transparent ferrule 10) by using an irradiator of the UV light to cure the UV adhesive. In this way, the plurality of lens units 20 are each fixed to the unit hole 13 of the ferrule 10. The plurality of optical fibers 3 are fixed inside an inner wall of the filling part 15.

As described above, the ferrule structure 1 according to the present embodiment includes the ferrule 10 including the plurality of unit holes 13, and the plurality of lens units 20. The lens unit 20 includes the lens part 21A, is attached to the end part of the optical fiber 3, and is molded from a transparent resin capable of transmitting an optical signal. Then, the lens unit 20 is inserted in each unit hole 13 of the ferrule 10.

In such a manner, in the present embodiment, the lens unit 20 (the lens part 21A) having a simple structure and the optical fiber 3 may be aligned one-to-one, and thus highly precise alignment between the optical fiber 3 and the lens part 21A can be achieved as compared to alignment of "multitude"-to-"multitude" (for example, as compared to a case where a plurality of optical fibers are aligned with lens parts of lens plates including multitude of lens parts). Since the lens part 21A expands a diameter of an optical signal, a position error of the unit hole 13 of the ferrule 10 is tolerated. Thus, manufacturing the ferrule 10 is also easy (or cost effective). In other words, in the present embodiment, the lens part 21A can be arranged with respect to each of the plurality of optical fibers 3 with high precision with a simple structure.

Modified Example of Lens Unit 20

Figure 7:
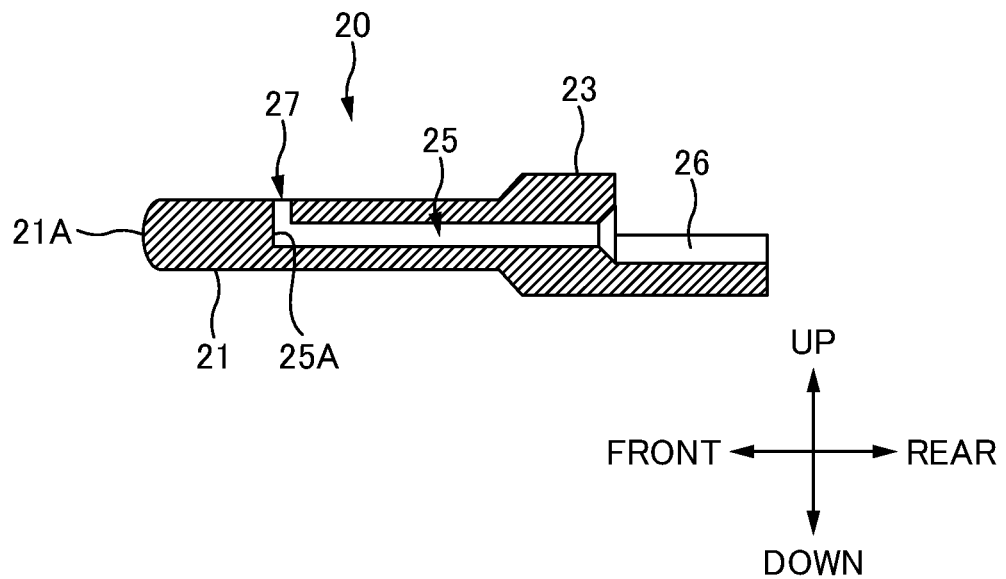
FIG. 7 is a diagram illustrating a modified example of the lens unit 20.

FIG. 7 is a diagram illustrating a modified example of the lens unit 20.

In the modified example, a part (a lower part in the diagram) of the flange part 23 of the lens unit 20 extends rearward. Then, a guide groove 26 is located in the extending part.

The guide groove 26 is a groove-shaped section located along the front-rear direction closer to the rear side than the fiber hole 25 (tapered surface 25B) of the lens unit 20. A front end of the guide groove 26 is continuous with a rear end of the tapered surface 25B.

By locating such a guide groove 26, it is easier to insert the optical fiber 3 in the fiber hole 25.

Second Embodiment

In the first embodiment, the lens part 21A of the lens unit 20 is arranged inside the unit hole 13 (front hole 13A), but the lens part 21A may protrude from the unit hole 13. However, when the lens part 21A protrudes from the unit hole 13 in the configuration of the first embodiment, there is a possibility that the lens part 21A may be damaged when ferrules are connected to each other and the like. Thus, in a second embodiment, a recessed part (a recessed part 12 described later) is formed in a front end surface of a ferrule 10 to suppress damage to a lens part 21A.

Figure 8A:
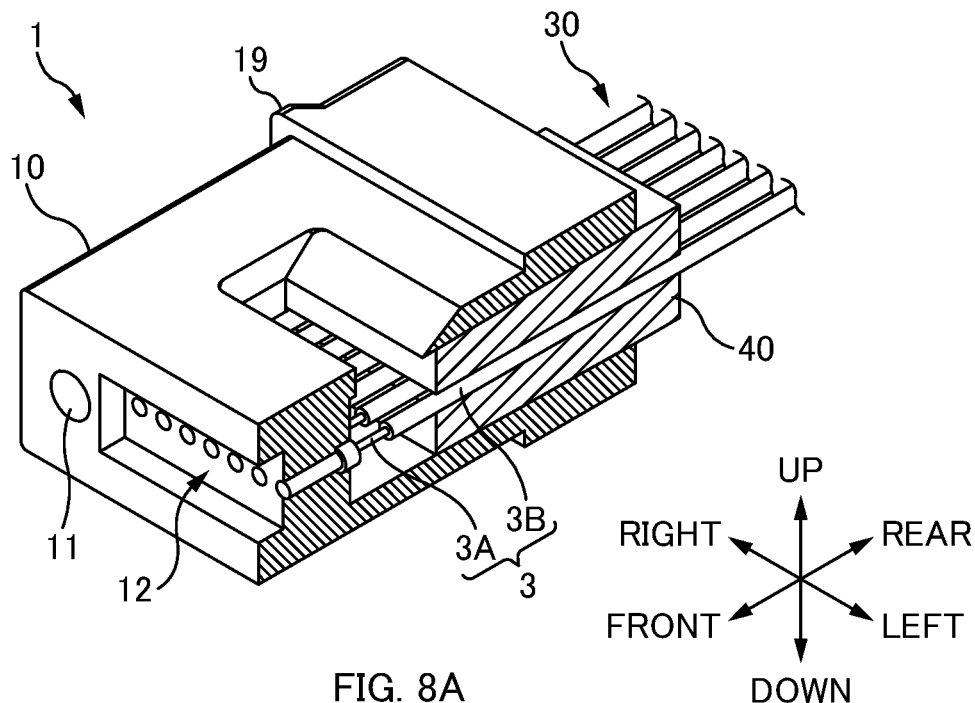
FIG. 8A is a cross-sectional perspective view of a ferrule structure 1 according to a second embodiment.
Figure 8B:
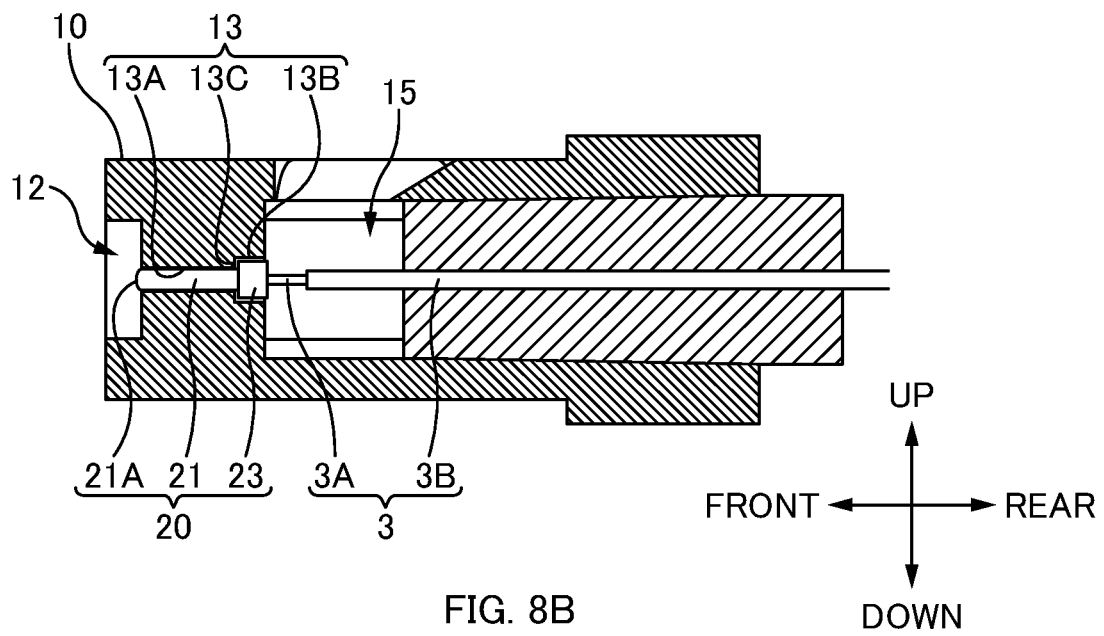
FIG. 8B is a cross-sectional view (side view) of the ferrule structure 1 according to the second embodiment.

FIG. 8A is a cross-sectional perspective view of a ferrule structure 1 according to the second embodiment. FIG. 8B is a cross-sectional view (side view) of the ferrule structure 1 according to the second embodiment. A part having the same configuration as that in the first embodiment is provided with the same reference sign, and description will be omitted.

The ferrule 10 according to the second embodiment includes the recessed part 12. The recessed part 12 is a section being recessed rearward from the front endface of the ferrule 10. The recessed part 12 is located between two guide holes 11 in the front endface of the ferrule 10, and is formed in a long and narrow rectangular shape in the left-right direction. Openings of a plurality of unit holes 13 (front holes 13A) are formed in a bottom part of the recessed part 12. As illustrated in FIG. 8B, the lens part 21A of the lens unit 20 protrudes forward from the opening of each unit hole 13 (front hole 13A) of the recessed part 12.

Note that, as illustrated in FIG. 8B, a tip of the lens part 21A is arranged closer to the rear side than the front endface of the ferrule 10 (a contact end face with a ferrule on the other side). In this way, even when the lens part 21A protrudes forward from the unit hole 13, damage to the lens part 21A can be suppressed.

Third Embodiment

Figure 9A:
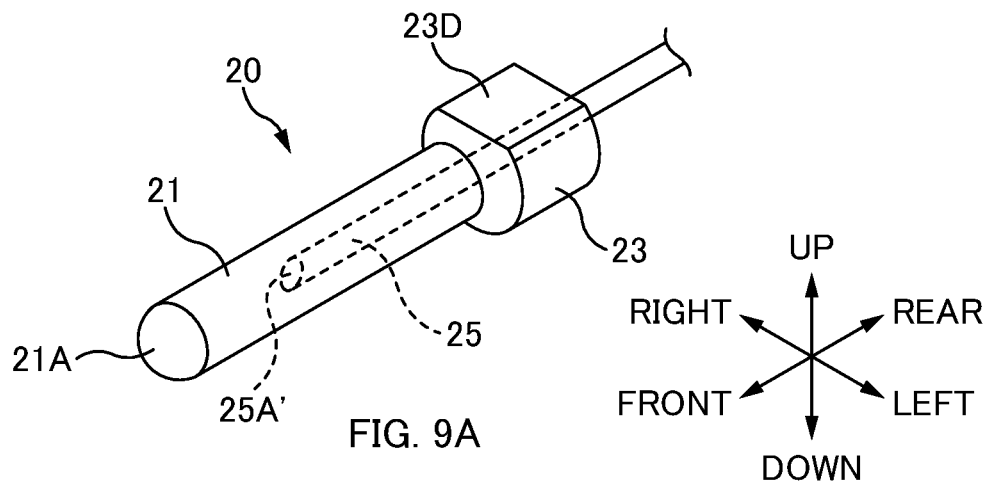
FIG. 9A is a perspective view of a lens unit 20 according to a third embodiment.
Figure 9B:
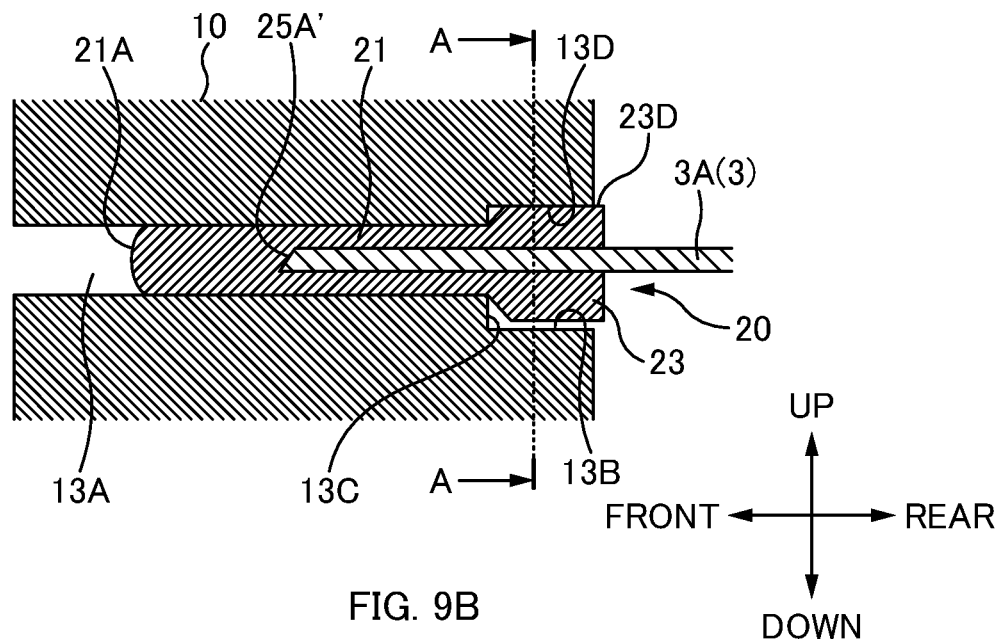
FIG. 9B is a cross-sectional view (side view) in the vicinity of a unit hole 13 of a ferrule structure 1 according to the third embodiment.
Figure 9C:
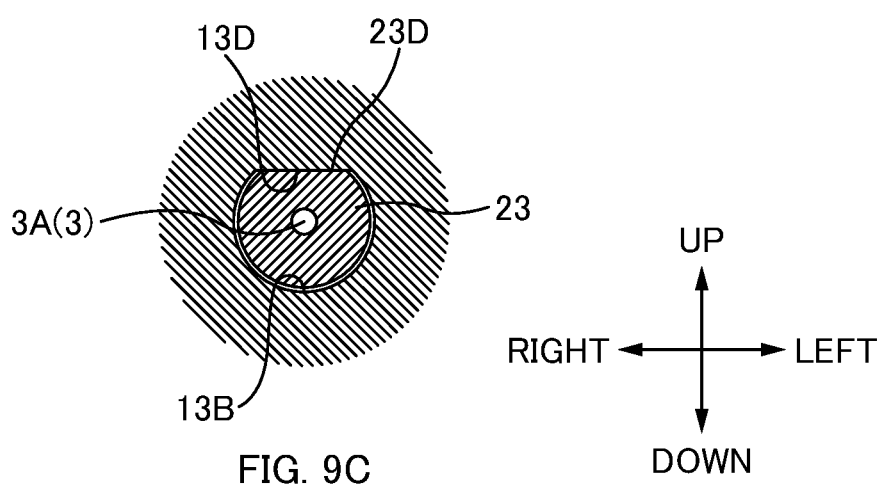
FIG. 9C is a cross-sectional view taken along a line A-A in FIG. 9B.

FIG. 9A is a perspective view of a lens unit 20 according to a third embodiment. FIG. 9B is a cross-sectional view (side view) in the vicinity of a unit hole 13 of a ferrule structure 1 according to the third embodiment. FIG. 9C is a cross-sectional view taken along a line A-A in FIG. 9B.

In the third embodiment, an end face of an optical fiber 3 is inclined obliquely with respect to a plane perpendicular to the front-rear direction (optical axis direction). Specifically, the end face of the optical fiber 3 is inclined with an upper side closer to the rear side. In this way, reflection of an optical signal can be suppressed, and a loss of the optical signal can be reduced.

An abutment part 25A' (corresponding to an abutment surface) is included in a fiber hole 25 of the lens unit 20. The abutment part 25A' is a section for abutment of the end face of the optical fiber 3, and is located in a front end part of the fiber hole 25. The abutment part 25A' according to the present embodiment is inclined obliquely (with an upper side closer to the rear side) with respect to the plane perpendicular to the front-rear direction (optical axis direction) so as to correspond to the end face of the optical fiber 3. In this way, the oblique end face of the optical fiber 3 can reliably abut the abutment part 25A'. The abutment part 25A' is inclined, and thus a return loss can be reduced.

A flat surface (reference plane 23D: corresponding to a positioning part) is formed on a part (upper part in the present embodiment) of a periphery of a flange part 23 of the lens unit 20. Thus, the flange part 23 of the lens unit 20 according to the third embodiment has a D-shaped cross section (cf. FIG. 9C).

A flat surface (reference plane 13D: corresponding to a positioning part) corresponding to the reference plane 23D of the lens unit 20 (flange part 23) is formed in a rear hole 13B of the unit hole 13 of the ferrule 10. Thus, the rear hole 13B of the unit hole 13 of the ferrule 10 according to the third embodiment also has a D-shaped cross section (cf. FIG. 9C).

Then, when the lens unit 20 to which the optical fiber 3 is attached is inserted into the unit hole 13 of the ferrule 10, the reference plane 23D of the lens unit 20 faces the reference plane 13D of the rear hole 13B of the unit hole 13 as illustrated in FIGS. 9B and 9C. In this way, alignment in a rotation direction about an optical axis of the optical fiber 3 is automatically performed. Thus, the alignment in the rotation direction can be easily and reliably performed. In this way, the oblique end face of the optical fiber 3 can be arranged in an intended direction.

Note that any one of the abutment part 25A' of the fiber hole 25 of the lens unit 20 and the end face of the optical fiber 3 may be a plane perpendicular to the front-rear direction (optical axis direction).

Fourth Embodiment

In the aforementioned embodiments, the optical fiber 3 (a bare optical fiber 3A) is inserted and fixed to the fiber hole 25 of the lens unit 20 being formed in advance, but the present disclosure is not limited thereto. For example, the lens unit 20 may be injection-molded (molded) at the end part of the optical fiber 3 (the bare optical fiber 3A) by using a die. However, in this case, there is a possibility that a sheath of the sheath part 3B may be melted by heat of the die. Thus, in one or more embodiments, an epoxy-based resin is used for molding.

Figure 10A:
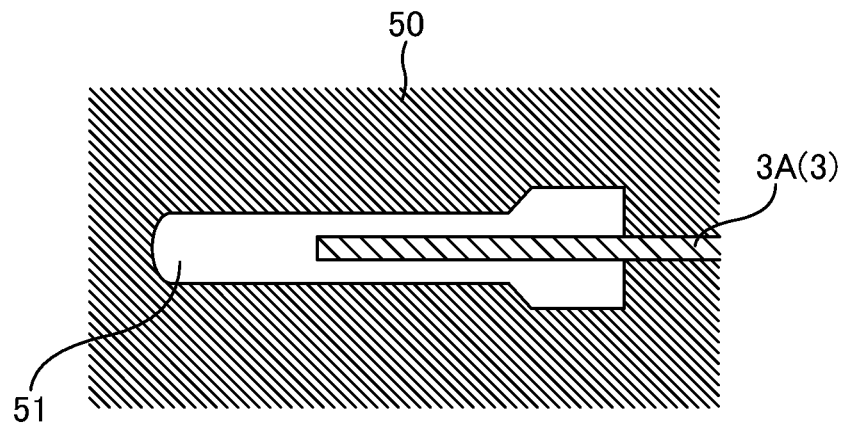
FIGS. 10A, 10B, and 10C are explanatory views of a manufacturing method by injection molding.
Figure 10B:
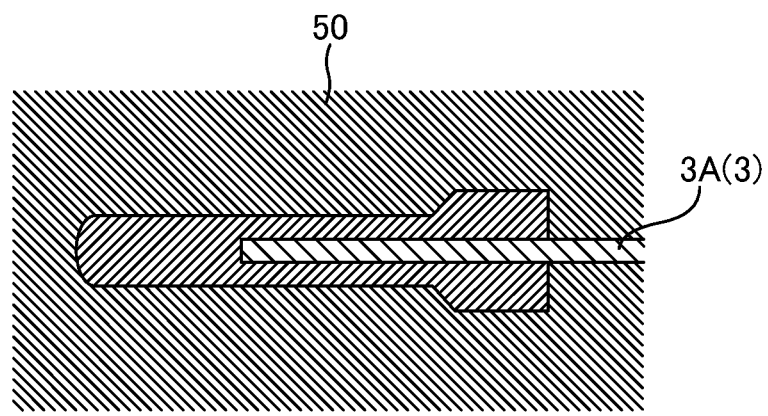
Figure 10C:
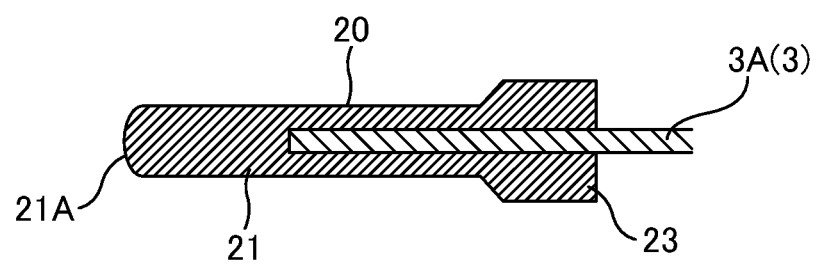

FIGS. 10A to 10C are explanatory views of a manufacturing method by injection molding. Here, a case where the manufacturing method is applied to the first embodiment (end face of the optical fiber 3 is perpendicular to the front-rear direction) will be described, but the manufacturing method can also be similarly applied to the third embodiment. In the manufacturing method, a die 50 including a chamber 51 corresponding to an outer shape of the lens unit 20 is used.

First, as illustrated in FIG. 10A, an operator arranges the end part of the optical fiber 3 (the bare optical fiber 3A) inside the chamber 51 of the die 50.

Next, as illustrated in FIG. 10B, the operator injects a resin (epoxy-based resin) into the chamber 51.

Subsequently, as illustrated in FIG. 10C, the operator removes the resin from the die 50. In this way, the lens unit 20 to which the optical fiber 3 is attached is formed.

In the manufacturing method, highly precise alignment between the optical fiber 3 and the lens part 21A can be achieved by increasing arrangement precision of the optical fiber 3 into the chamber 51 of the die 50. In the manufacturing method, the lens unit 20 is molded at the end part of the optical fiber 3 (the optical fiber 3 does not need to be inserted in the fiber hole), and thus the lens unit 20 does not need the air hole 27, the tapered surface 25B, and the guide groove in the aforementioned embodiments. In other words, the configuration of the lens unit 20 can be simplified.

On the other hand, in the manufacturing method (method for inserting and fixing the end part of the optical fiber 3 to the fiber hole 25 of the lens unit 20 being molded in advance) in the aforementioned embodiments, there is no possibility that a sheath of the sheath part 3B of the optical fiber 3 is melted by heat, and thus a restriction on a resin to be used is reduced (a resin other than an epoxy-based resin can also be used).

In the aforementioned embodiments, the UV adhesive is used as an adhesive for filling the fiber hole 25 and the filling part 15, but the present disclosure is not limited thereto. For example, a thermosetting adhesive may be used. In this case, the ferrule 10 may be formed of a material that does not transmit an optical signal.

Fifth Embodiment

Figure 11A:
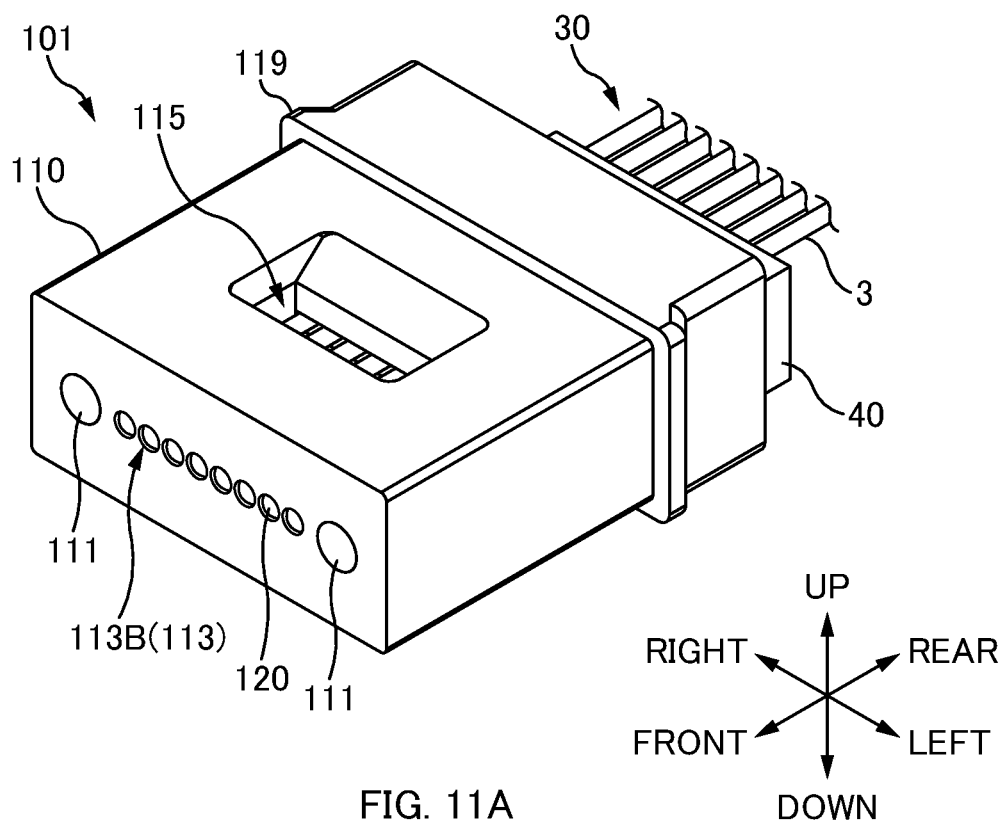
FIG. 11A is a general perspective view of a ferrule structure 101 according to a fifth embodiment.
Figure 11B:
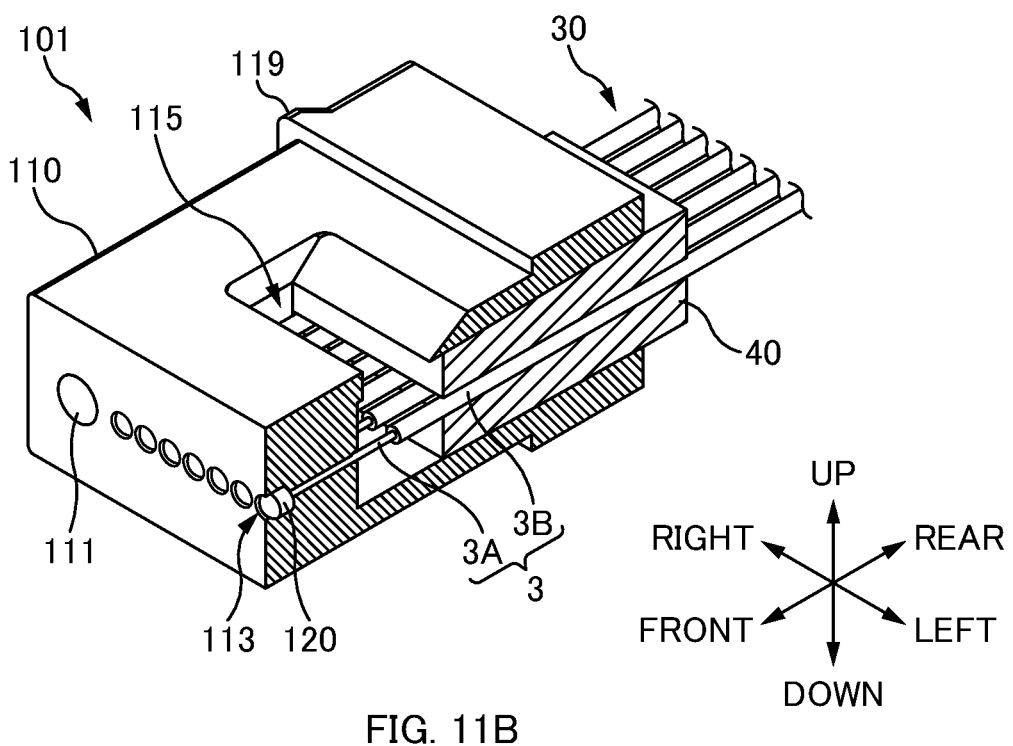
FIG. 11B is a cross-sectional perspective view of the ferrule structure 101 according to the fifth embodiment.
Figure 12A:
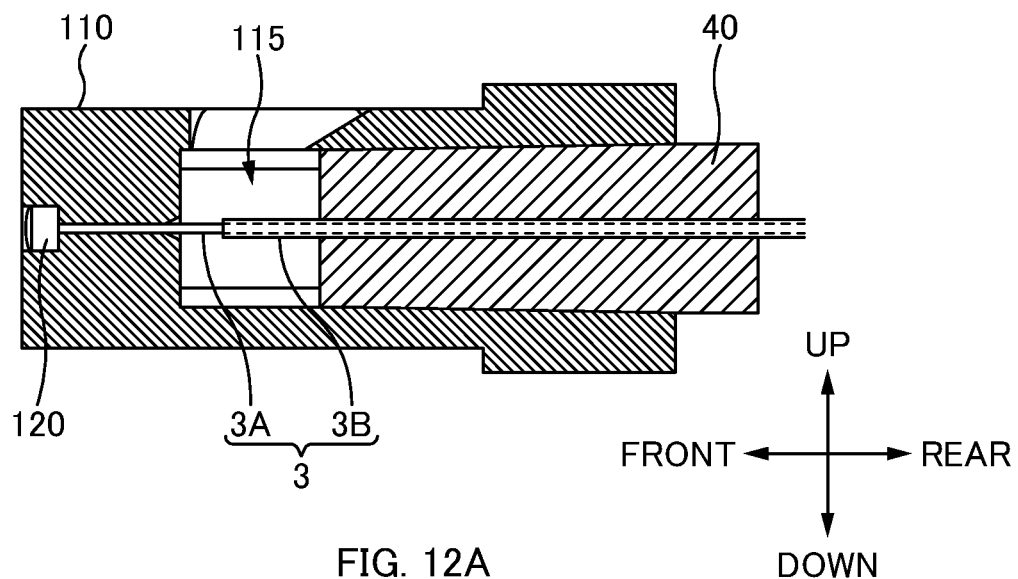
FIG. 12A is a cross-sectional view of the ferrule structure 101 according to the fifth embodiment.
Figure 12B:
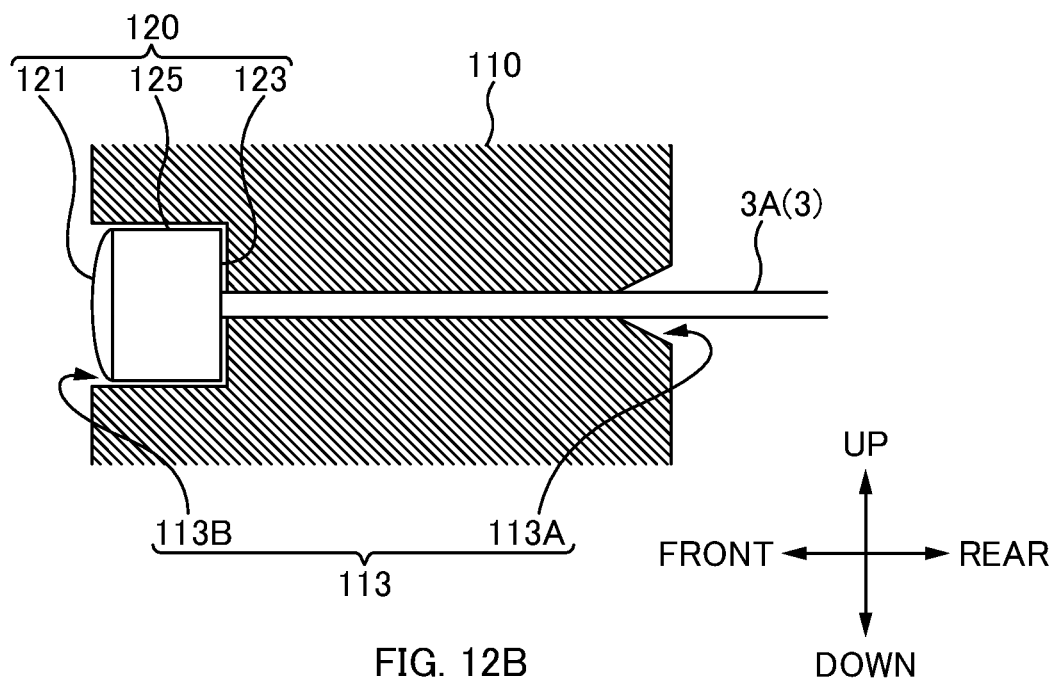
FIG. 12B is a partially enlarged perspective view of the ferrule structure 101 according to the fifth embodiment.
Figure 13A:
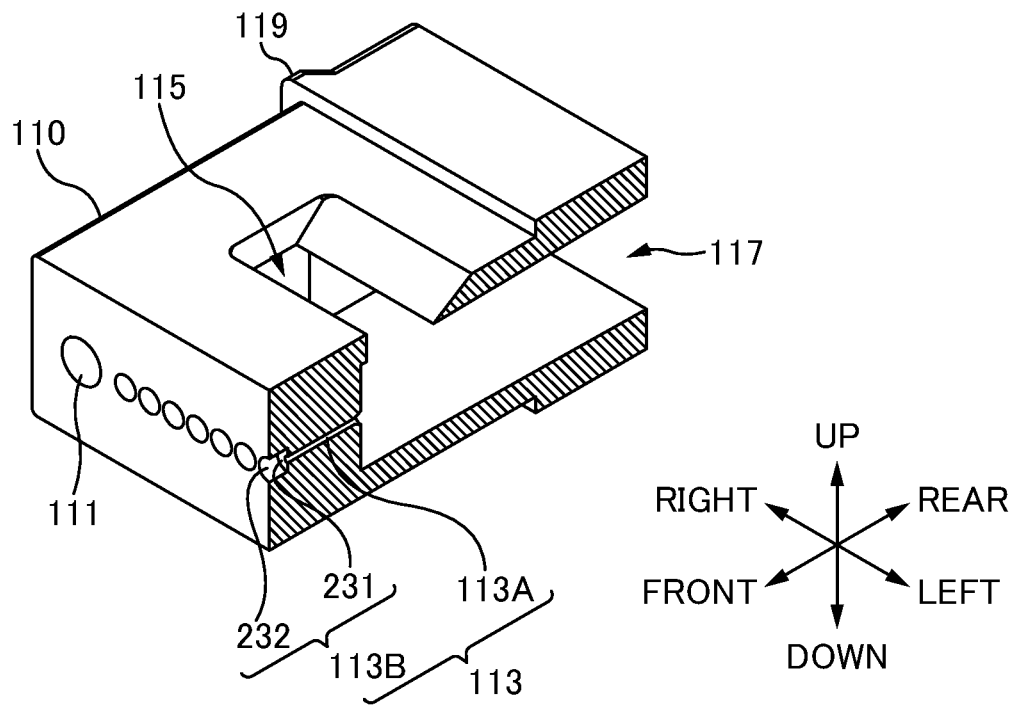
FIG. 13A is a perspective view of a ferrule 110 according to the fifth embodiment.
Figure 13B:
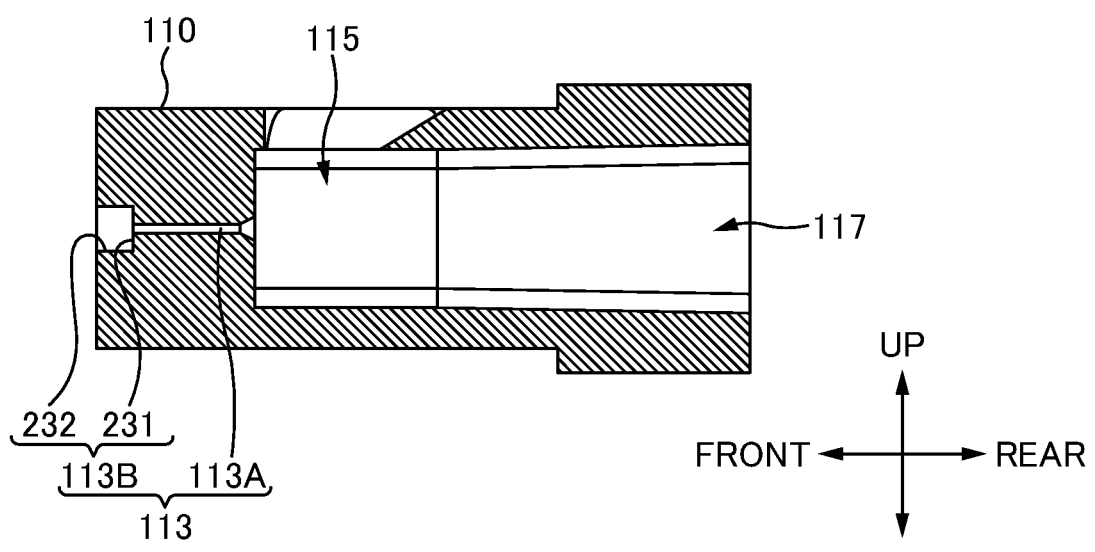
FIG. 13B is a cross-sectional view of the ferrule 110 according to the fifth embodiment.

FIG. 11A is a general perspective view of a ferrule structure 101 according to a fifth embodiment. FIG. 11B is a cross-sectional perspective view of the ferrule structure 101 according to the fifth embodiment. FIG. 12A is a cross-sectional view of the ferrule structure 101 according to the fifth embodiment. FIG. 12B is a partially enlarged perspective view of the ferrule structure 101 according to the fifth embodiment. FIG. 13A is a perspective view of a ferrule 110 according to the fifth embodiment. FIG. 13B is a cross-sectional view of the ferrule 110 according to the fifth embodiment.

In the present embodiment, a "front-rear direction", a "left-right direction", and an "up-down direction" are defined as follows. The front-rear direction is an optical axis direction of an optical fiber 3, a side of an end face of the optical fiber 3 is "front", and an opposite side thereof is "rear". The left-right direction is a direction in which two guide holes 111 are aligned, a right side when a front side is seen from a rear side is "right", and a left side is "left". The up-down direction is a direction orthogonal to the left-right direction and the front-rear direction, a side on which an opening for filling an adhesive is located in a filling part 115 in the ferrule 110 is "up", and an opposite side is "down".

General Description

The ferrule structure 101 according to the present embodiment includes the ferrule 110, a lens part 120, an optical fiber ribbon 30, and a boot 40.

The ferrule 110 is a member for holding an end part of the optical fiber 3 and optically connecting the optical fiber 3 to another optical component, and is, for example, a pin mating type MT ferrule. The ferrule 110 according to the present embodiment is integrally molded from a resin (for example, a transparent resin) capable of transmitting an optical signal. The ferrule 110 includes a guide hole 111, a through hole 113, the filling part 115, a boot hole 117, and a flange part 119.

The guide hole 111 is a hole for insertion of a guide pin (not illustrated). The guide pin is inserted in the guide hole 111, and thus ferrules are aligned with each other. Two guide holes 111 are open in a front end surface (connecting end face) of the ferrule 110. The two guide holes 111 are arranged at an interval in the left-right direction so as to sandwich a plurality of the through holes 113 in the left-right direction.

The through hole 113 is a hole that penetrates between the front endface of the ferrule 110 and the filling part 115 in the front-rear direction. The plurality of (here, eight) through holes 113 are aligned and provided between the two guide holes 111 of the ferrule 110 in the left-right direction. Each of the plurality of through holes 113 includes a fiber hole 113A and a lens housing part 113B.

The fiber hole 113A is a hole for insertion of the end part of the optical fiber 3 (a bare optical fiber 3A), and is formed along the front-rear direction between the filling part 115 and the lens housing part 113B (a bottom surface 231). A rear end part (an opening on the filling part 115 side) of the fiber hole 113A is formed in a tapered shape. In this way, when the end part of the optical fiber 3 is inserted into the fiber hole 113A, it is easy to guide the optical fiber 3 into the fiber hole 113A.

The lens housing part 113B is a section for housing the lens part 120 (being fit with the lens part 120). Note that, since the lens part 120 is arranged closer to the front side than the end face of the optical fiber 3, the lens housing part 113B is provided closer to the front side than the fiber hole 113A. The lens housing part 113B includes the bottom surface 231 (corresponding to a step part) and a side surface 232 (corresponding to an inner wall surface).

The bottom surface 231 is a section (surface) constituting a step with respect to the fiber hole 113A, and an opening of the fiber hole 113A is provided in the bottom surface 231. A diameter of the bottom surface 231 is provided so as to be almost the same as a diameter of the lens part 120. The bottom surface 231 is a section facing a rear end surface (an abutment part 123) of the lens part 120, and has a function of performing alignment of the lens part 120 in the front-rear direction.

The side surface 232 is a wall-shaped section (an inner wall surface of the lens housing part 113B) between an edge of the bottom surface 231 and the front endface of the ferrule 110. The side surface 232 is a section facing a side surface 125 of the lens part 120, and has a function of performing alignment of the lens part 120 in the up-down direction and the left-right direction (directions perpendicular to an optical axis of the optical fiber 3).

The filling part 115 is a hollow part to be filled with an adhesive. The filling part 115 is a hollow elongated in the left-right direction. An adhesive for keeping the optical fiber 3 in the ferrule 110 fills the filling part 115. The adhesive fills the filling part 115, and is thus applied between inner wall surfaces of the filling part 115 and the optical fiber 3. This adhesive is cured to fix the optical fiber 3 to the ferrule 110.

The boot hole 117 is located so as to penetrate between the rear endface of the ferrule 110 and the filling part 115 in the front-rear direction. The boot hole 117 is a hole for housing and fixing the boot 40 attached to the optical fiber ribbon 30 (the plurality of optical fibers 3).

The flange part 119 is a section protruding outward from an outer surface of the ferrule 110.

The lens part 120 is integrally molded from a transparent resin. The lens part 120 includes a lens surface 121, the abutment part 123, and the side surface 125.

The lens surface 121 is located at a tip of the lens part 120 as illustrated in FIG. 12B, and is arranged closer to the front side than the end face of the optical fiber 3. The lens surface 121 has a shape protruding forward, and functions as a collimator lens. In other words, the lens surface 121 has a function of emitting, as collimated light, an optical signal emitted from the optical fiber 3, and a function of converging incident collimated light and causing the collimated light to be incident on the end face of the optical fiber 3. In one or more embodiments, in order to suppress damage to the lens surface 121, a tip (front end) of the lens surface 121 is arranged closer to the rear side than the front endface of the ferrule 110 (i.e., in one or more embodiments, the lens housing part 113B is formed to be deeper than a thickness of the lens part 120).

The abutment part 123 is located on an end part of the lens part 120 opposite to the lens surface 121, and is a section for abutment of the end face of the optical fiber 3. The abutment part 123 in the present embodiment is a flat surface, and is arranged perpendicular to the optical axis direction (front-rear direction) when the lens part 120 is housed in the lens housing part 113B.

The side surface 125 is a surface (side surface) surrounding a circumference (periphery) of the lens part 120 along an edge of the lens surface 121 and the abutment part 123.

The optical fiber ribbon 30 is formed by coupling (for example, intermittently coupling) the plurality of (herein, eight) optical fibers 3 in parallel. Note that illustration of a coupling member is omitted in FIG. 11.

The optical fiber 3 is a member that transmits an optical signal. As illustrated in FIG. 11, the eight optical fibers 3 are arranged (aligned) in the left-right direction in the ferrule 110. Each of the optical fibers 3 includes the bare optical fiber 3A and a sheath part 3B. In the sheath part 3B, the outside of the bare optical fiber 3A is covered with a sheath.

The boot 40 is a tubular body including a through hole through which the plurality of optical fibers 3 of the optical fiber ribbon 30 pass, and is inserted in the boot hole 117 of the ferrule 110. The boot 40 is integrally molded from an elastic body (elastomer) such as rubber and plastic, and holds the plurality of optical fibers 3 of the optical fiber ribbon 30. In such a manner, the optical fibers 3 are held via the boot 40 formed of an elastic body, and thus, even when a bending force is applied to the optical fibers 3, the boot 40 absorbs the force and can prevent an abrupt bend occurring in the optical fibers 3.

Manufacturing Method

FIGS. 14A to 14D are schematic explanatory views of a method for manufacturing the ferrule structure 101 according to the present embodiment.

First, an operator performs pretreatment on the end part of each optical fiber 3. Specifically, the operator removes a sheath of the sheath part 3B of the optical fiber 3 by a determined dimension, and cuts, at a predetermined length, the optical fiber 3 (the bare optical fiber 3A) having the sheath being removed. The pretreatment is similarly performed on all of the optical fibers 3 of the optical fiber ribbon 30. Note that only one combination of the optical fiber 3 and the lens part 120 will be described (illustrated) below, but the same applies to other combinations of the optical fiber 3 and the lens part 120.

Figure 14A:
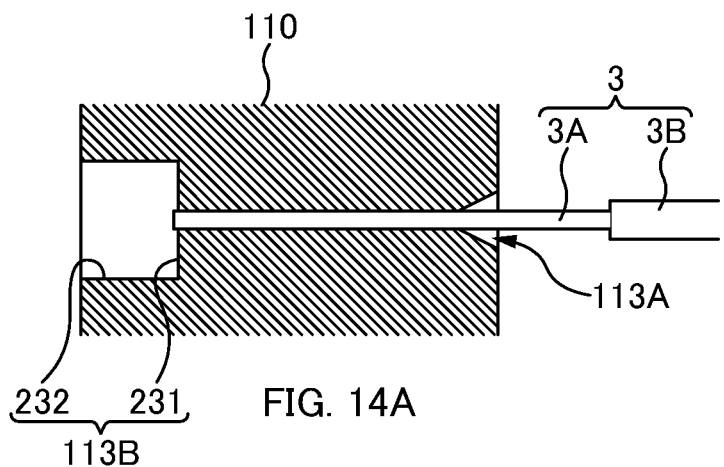
FIGS. 14A, 14B, 14C, and 14D are schematic explanatory views of a method for manufacturing the ferrule structure 101 according to the one or more embodiments.

Next, the operator prepares the ferrule 110 having the configuration described above, and inserts the optical fiber 3 (the bare optical fiber 3A) into the fiber hole 113A of the ferrule 110 as illustrated in FIG. 14A. Then, the end part of the optical fiber 3 slightly protrudes from the opening of the fiber hole 113A in the bottom surface 231 of the lens housing part 113B.

Figure 14B:
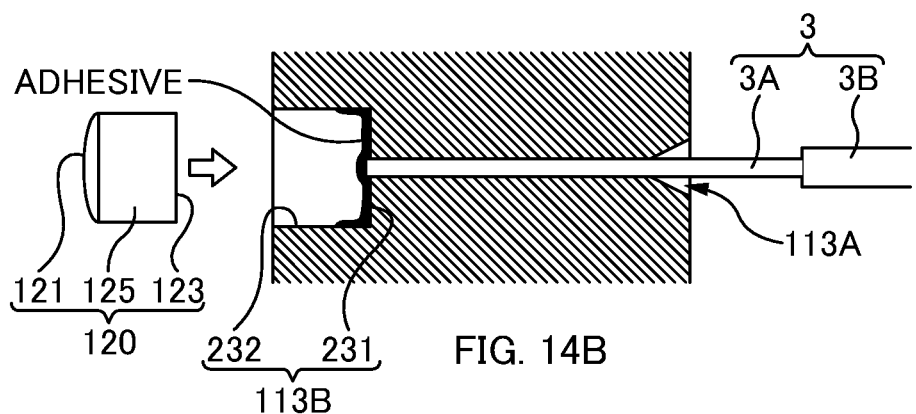

Next, as illustrated in FIG. 14B, the operator applies an adhesive (here, an ultraviolet curable adhesive (hereinafter, a UV adhesive) also serving as a refractive index matching material) to the inside of the lens housing part 113B from the front side. In this way, the UV adhesive is applied to the bottom surface 231 of the lens housing part 113B and the end part of the optical fiber 3. The UV adhesive is also permeated between the fiber hole 113A and the optical fiber 3 (the bare optical fiber 3A).

Figure 14C:
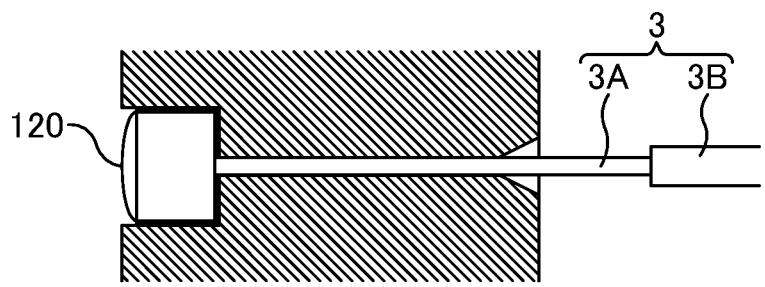

Next, the operator inserts (houses) the lens part 120 in the lens housing part 113B. By housing the lens part 120 in the lens housing part 113B, as illustrated in FIG. 14C, the side surface 125 of the lens part 120 is in contact with the side surface 232 (corresponding to the inner wall surface) of the lens housing part 113B. In this way, alignment of the lens part 120 in the up-down direction and the left-right direction is performed. The abutment part 123 of the lens part 120 is in contact with the bottom surface 231 (corresponding to the step part) of the lens housing part 113B. In this way, alignment of the lens part 120 in the front-rear direction is performed. As described above, the end part of the optical fiber 3 protrudes from the opening on the front side of the fiber hole 113A, and thus the optical fiber 3 reliably abuts the abutment part 123 of the lens part 120. Thus, when the abutment part 123 of the lens part 120 is in contact with the bottom surface 231 of the lens housing part 113B, the optical fiber 3 is pressed rearward and slightly bent. Thus, a bend of the optical fiber 3 may be confirmed from the filling part 115 side. In this way, whether the lens part 120 can be reliably housed in the lens housing part 113B can be determined.

Note that the UV adhesive is applied to the end face of the optical fiber 3, and thus the UV adhesive (refractive index matching material) fills between the end face of the optical fiber 3 and the abutment part 123 of the lens part 120. By housing the lens part 120 in the lens housing part 113B, the UV adhesive is permeated in a gap between the side surface 125 of the lens part 120 and the side surface 232 of the lens housing part 113B.

Although not illustrated, the operator also fills the adhesive in the filling part 115. Here, the UV adhesive fills from an opening above the filling part 115. The UV adhesive fills the filling part 115, and is also permeated between the fiber hole 113A and the optical fiber 3 (the bare optical fiber 3A). Note that the UV adhesive (the adhesive filling the filling part 115) used herein may not be transparent, and thus may not serve as a refractive index matching material (i.e., a UV adhesive different from the UV adhesive applied to the lens housing part 113B may be used). However, the same UV adhesive (refractive index matching material) as the UV adhesive applied to the lens housing part 113B may be used.

Figure 14D:
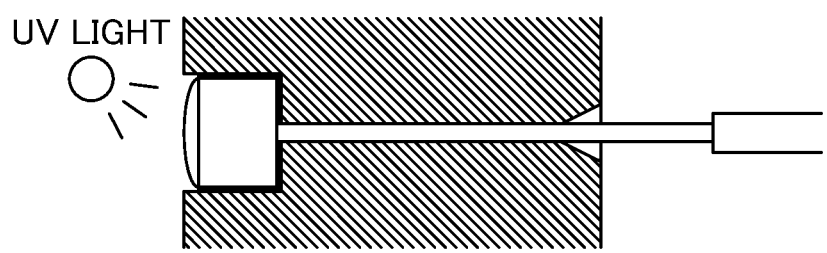

Next, as illustrated in FIG. 14D, the operator irradiates the ferrule 110 with UV light (applies UV light over the transparent ferrule 110) by using an irradiator of the UV light to cure the UV adhesive. In this way, the plurality of lens parts 120 are each fixed to the lens housing part 113B of the ferrule 110. The bare optical fiber 3A is fixed to the fiber hole 113A, and the plurality of optical fibers 3 are fixed inside an inner wall of the filling part 115.

Note that the method for manufacturing the ferrule structure 101 is not limited to that described above. For example, after the lens part 120 is fixed (bonded) to the lens housing part 113B, the UV adhesive may fill the filling part 115 and UV irradiation may be performed. Alternatively, after the lens part 120 is fixed (bonded) to the lens housing part 113B, the optical fiber 3 may be inserted in the fiber hole 113A (the end face of the optical fiber 3 may abut the abutment part 123 of the lens part 120), and the UV adhesive may fill the filling part 115.

An adhesive to be used is not limited to the UV adhesive. For example, a thermosetting adhesive may be used. In this case, the ferrule 110 may be formed of a material that does not transmit an optical signal.

As described above, the ferrule structure 101 according to the present embodiment includes the ferrule 110 including the plurality of fiber holes 113A, and the plurality of lens parts 120. The lens housing part 113B is formed on the front side of each of the fiber holes 113A, and the lens part 120 is housed in each of the plurality of lens housing parts 113B.

In the present embodiment, when each of the fiber holes 113A and the lens housing part 113B on the front side of each of the fiber holes 113A are formed with predetermined position precision, position precision between the end face of the optical fiber 3 inserted in the fiber hole 113A and the lens part 120 housed in the lens housing part 113B can be secured. Thus, highly precise alignment between the plurality of optical fibers 3 and the plurality of lens parts 120 can be achieved with a simple structure. In other words, in the present embodiment, the optical fiber 3 and the lens part 120 (the lens surface 121) can be aligned one-to-one, and thus highly precise alignment between the optical fiber 3 and the lens part 120 can be achieved with a simple structure as compared to alignment of "multitude"-to-"multitude" (for example, as compared to a case where a plurality of optical fibers are aligned with lens parts of lens plates including multitude of lens parts).

Sixth Embodiment

In the fifth embodiment, the lens part 120 is arranged inside the lens housing part 113B (i.e., the lens surface 121 of the lens part 120 is located closer to the rear side than the front end of the lens housing part 113B), but the lens part 120 may protrude from the lens housing part 113B. However, when the lens part 120 protrudes from the lens housing part 113B in the configuration of the fifth embodiment, there is a possibility that the lens part 120 (the lens surface 121) may be damaged when ferrules are connected to each other and the like. Thus, in a sixth embodiment, a recessed part (a recessed part 112 described later) is formed in a front end surface of a ferrule 110, and damage to a lens surface 121 is suppressed.

Figure 15A:
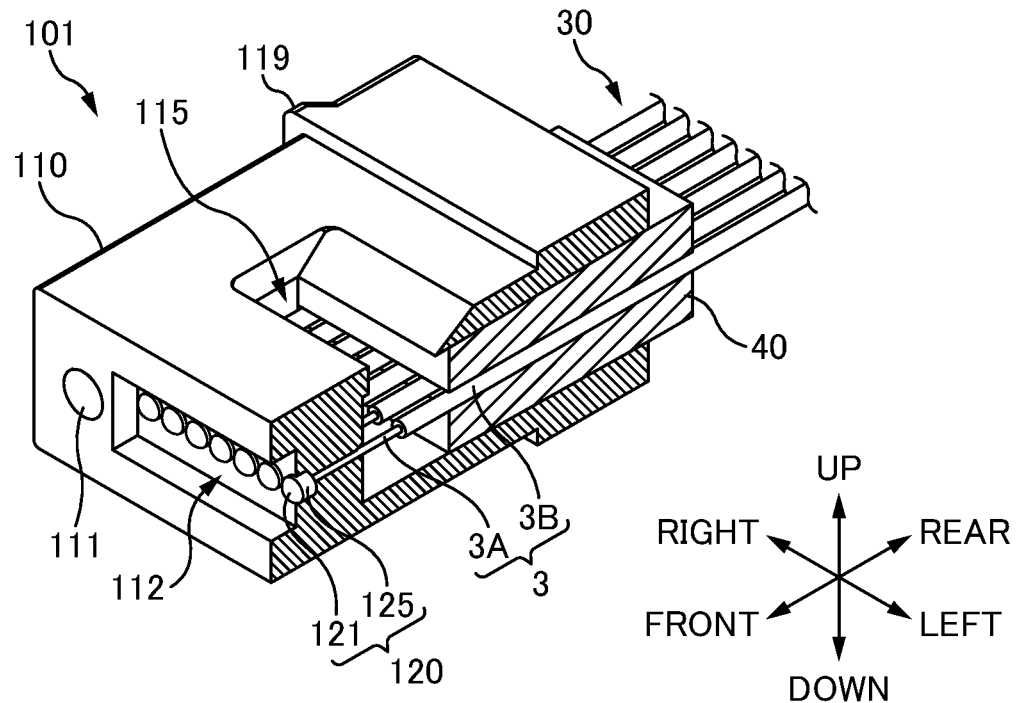
FIG. 15A is a cross-sectional perspective view of a ferrule structure 101 according to a sixth embodiment.
Figure 15B:
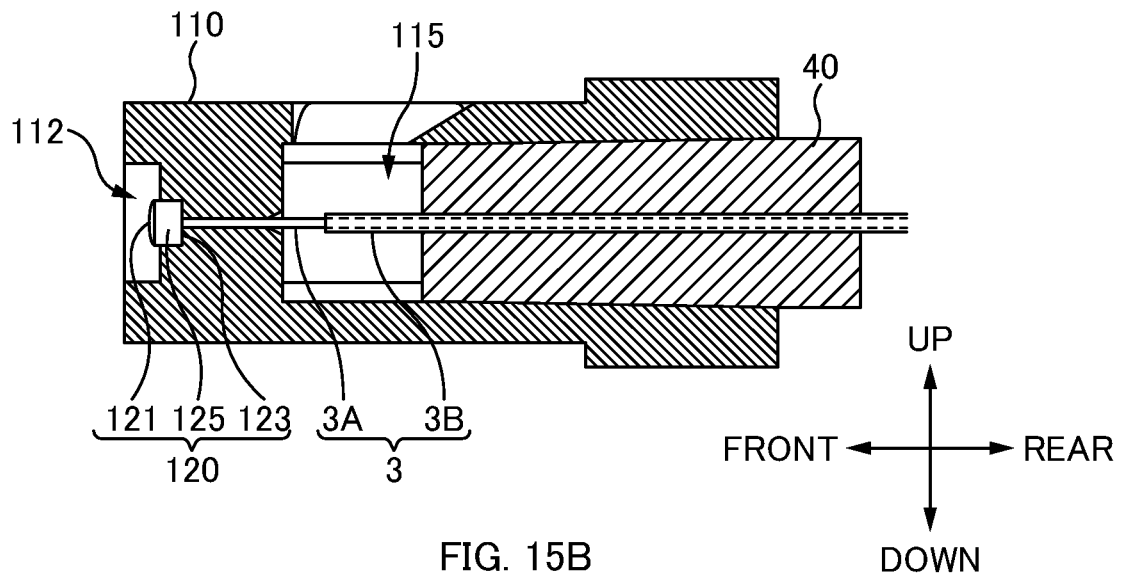
FIG. 15B is a cross-sectional view (side view) of the ferrule structure 101 according to the sixth embodiment.

FIG. 15A is a cross-sectional perspective view of a ferrule structure 101 according to the sixth embodiment. FIG. 15B is a cross-sectional view (side view) of the ferrule structure 101 according to the sixth embodiment. A part having the same configuration as that in the fifth embodiment is provided with the same reference sign, and description will be omitted.

The ferrule 110 according to the sixth embodiment includes the recessed part 112. The recessed part 112 is a section being recessed rearward from the front endface of the ferrule 110. The recessed part 112 is provided between two guide holes 111 in the front endface of the ferrule 110, and is formed in a long and narrow rectangular shape in the left-right direction. A plurality of openings of through holes 113 (more specifically, lens housing parts 113B) are formed in a bottom part (bottom surface) of the recessed part 112. As illustrated in FIG. 15B, a lens part 120 (the lens surface 121) protrudes forward from the opening of the lens housing part 113B of the recessed part 112.

Note that, as illustrated in FIG. 15B, a tip of the lens surface 121 is arranged closer to the rear side than the front endface of the ferrule 110 (a contact end face with a ferrule on the other side). In this way, even when the lens part 120 protrudes forward from the lens housing part 113B, damage to the lens part 120 (the lens surface 121) can be suppressed. In the sixth embodiment, the lens part 120 may protrude forward from the lens housing part 113B (i.e., the lens housing part 113B may be shallower than a thickness of the lens part 120), and thus it is easy to insert (house) the lens part 120 in the lens housing part 113B, and it is easy to bring an abutment part 123 of the lens part 120 into contact with a bottom surface 231 of the lens housing part 113B.

Seventh Embodiment

Figure 16A:
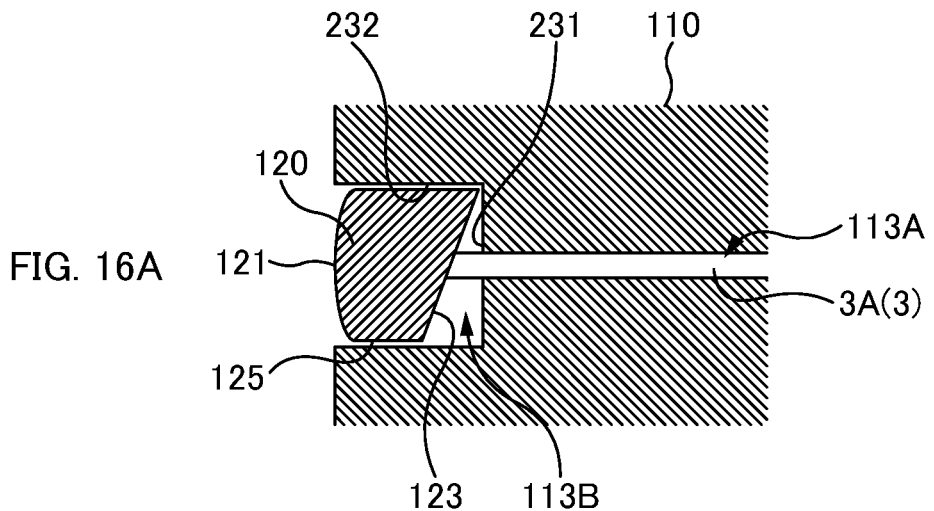
FIG. 16A is a cross-sectional view (side view) in the vicinity of a lens housing part 113B of a ferrule structure 101 according to a seventh embodiment.

FIG. 16A is a cross-sectional view (side view) in the vicinity of a lens housing part 113B of a ferrule structure 101 according to a seventh embodiment.

In the seventh embodiment, as illustrated in FIG. 16A, an end face of an optical fiber 3 is inclined obliquely with respect to a plane perpendicular to the front-rear direction (optical axis direction). Specifically, the end face of the optical fiber 3 is inclined with an upper side closer to the rear side. In such a manner, the end face of the optical fiber 3 is set as an inclination surface, and thus reflection of an optical signal can be suppressed, and a loss of the optical signal can be reduced.

Similarly to the end face of the optical fiber 3, an abutment part 123 of a lens part 120 is also inclined obliquely (with an upper side closer to the rear side) with respect to the plane perpendicular to the front-rear direction (optical axis direction). In this way, the oblique end face (inclination surface) of the optical fiber 3 can reliably abut to the abutment part 123. The abutment part 123 is inclined, and thus a return loss can be reduced (reflected return light can be suppressed, and an adverse effect on a light source element can be prevented).

First Modified Example

Figure 16B:
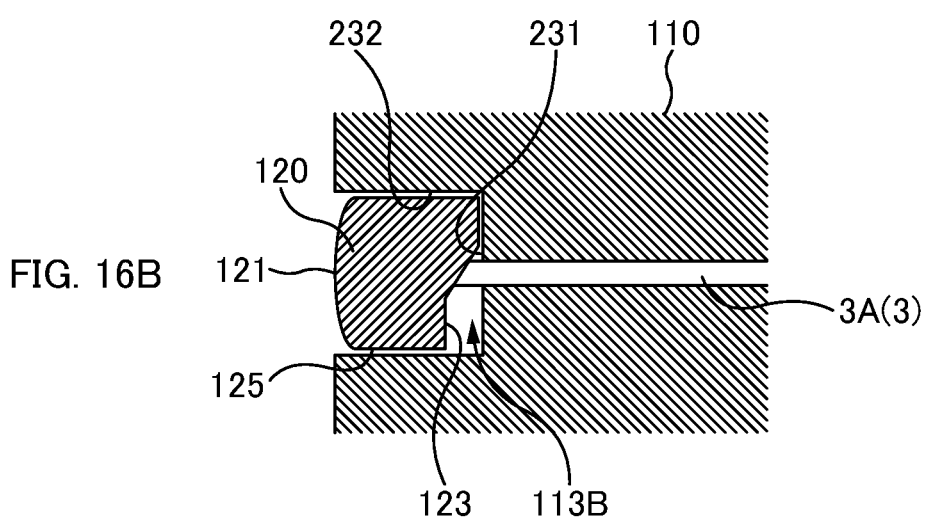
FIG. 16B is an explanatory view of a first modified example of the seventh embodiment.

FIG. 16B is an explanatory view of a first modified example of the seventh embodiment.

In the first modified example, only a part (a central part in the up-down direction) of the abutment part 123 of the lens part 120 in contact with the end face of the optical fiber 3 in the up-down direction is formed obliquely, and the other part is a plane perpendicular to the front-rear direction. In other words, a section (surface) of an upper part of the abutment part 123 above the optical fiber 3 is located closer to the rear side than a section (surface) of a lower part of the abutment part 123 below the optical fiber 3.

Thus, the section of the abutment part 123 above the optical fiber 3 is in contact with a bottom surface 231 of the lens housing part 113B. As compared to FIG. 16A, a length of a side surface 125 in the front-rear direction in a lower part of the lens part 120 is longer (i.e., an area of the side surface 125 has a larger area).

A shape in the aforementioned seventh embodiment (FIG. 16A) has a small contact area with the lens housing part 113B. In contrast, in the first modified example (FIG. 16B), a contact area between the lens part 120 and the lens housing part 113B can be increased further than that in FIG. 16A.

Second Modified Example

Figure 16C:
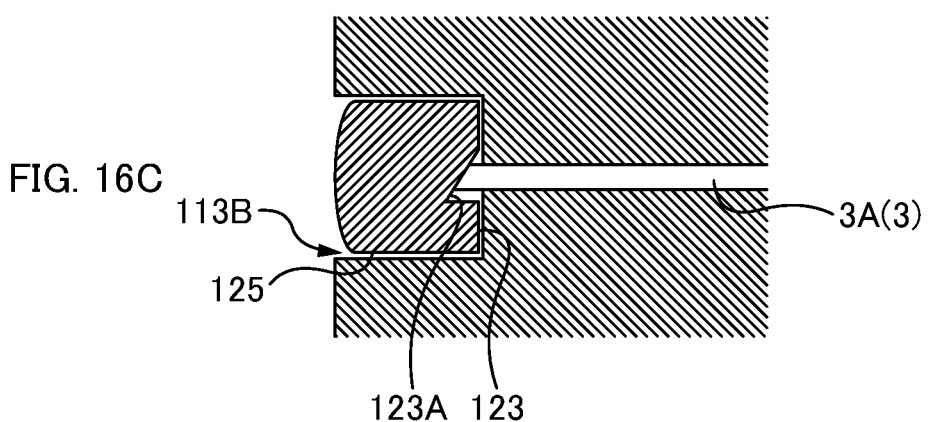
FIG. 16C is an explanatory view of a second modified example of the seventh embodiment.

FIG. 16C is an explanatory view of a second modified example of the seventh embodiment.

In the second modified example, a recessed part 123A being recessed forward is provided in a part of the abutment part 123 of the lens part 120 facing the end face of the optical fiber 3. Then, only a bottom surface of the recessed part 123A is inclined obliquely (is an inclination surface), and is abutted by the end face of the optical fiber 3.

As seen from the diagram, in the second modified example, a contact area between the lens part 120 and the lens housing part 113B can be further increased.

Note that, in this example, a section facing the end face of the optical fiber 3 has a recessed shape (is the recessed part 123A), but may have a protruding shape.

The recessed part 123A may have a groove shape or a hole shape. When the recessed part 123A is formed in a hole shape, the end face of the optical fiber 3 and the lens part 120 may be aligned with each other with high precision by inserting the end face of the optical fiber 3 in the recessed part 123A having a hole shape.

Eighth Embodiment

In the seventh embodiment, the end face of the optical fiber 3 and the abutment part 123 (the rear end surface) of the lens part 120 are each inclined obliquely with respect to the plane perpendicular to the optical axis direction (front-rear direction) of the optical fiber 3. In one or more embodiments, when the lens part 120 is inserted into the lens housing part 113B of the ferrule 110, alignment is performed in a rotation direction (hereinafter, also simply referred to as a rotation direction) about the optical axis direction (front-rear direction). Thus, in an eighth embodiment, alignment between a lens part 120 and a lens housing part 113B in the rotation direction can be easily performed.

Figure 17A:
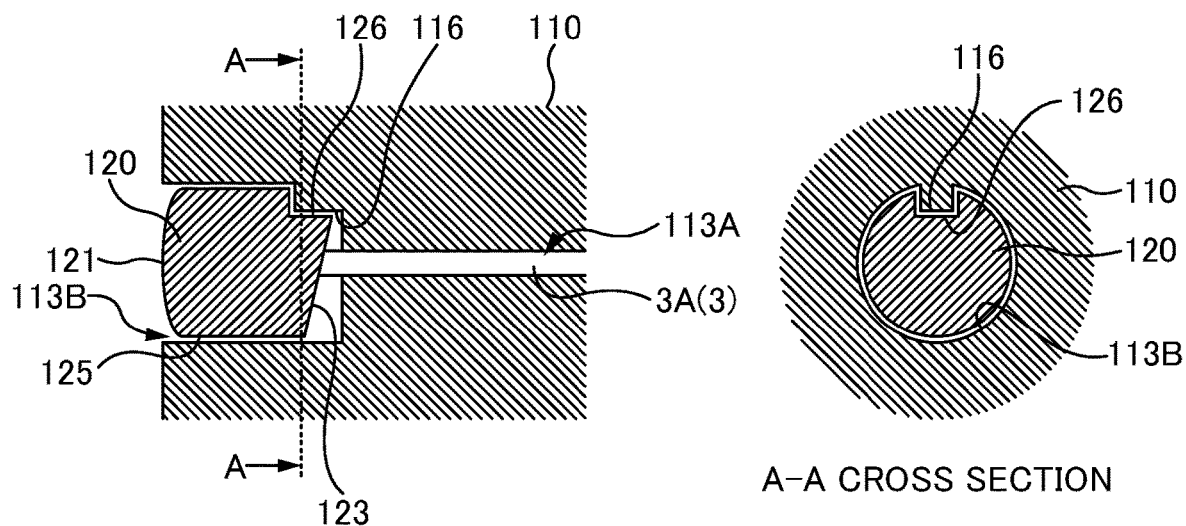
FIG. 17A is a cross-sectional view (side view) in the vicinity of a lens housing part 113B of a ferrule structure 101 according to an eighth embodiment.

FIG. 17A is a cross-sectional view (side view) in the vicinity of the lens housing part 113B of a ferrule structure 101 according to the eighth embodiment. Note that, in the eighth embodiment, an end face of an optical fiber 3 is inclined similarly to the seventh embodiment, and an abutment part 123 (a rear end surface) of the lens part 120 is also inclined.

A positioning part 126 having a recessed shape is located in a part (on the rear side of an upper end part in the diagram) of a periphery of the lens part 120 in the eighth embodiment.

A positioning part 116 having a protruding shape is provided, in a predetermined position (here, an upper end part) of a side surface 232, in the lens housing part 113B in the eighth embodiment. The positioning part 116 is provided in a shape (size) corresponding to the positioning part 126 of the lens part 120.

When the lens part 120 is inserted into the lens housing part 113B, a position of the positioning part 126 having a recessed shape of the lens part 120 may be aligned with a position of the positioning part 116 having a protruding shape of the lens housing part 113B. Then, by inserting the lens part 120 into the lens housing part 113B, the positioning part 126 having a recessed shape of the lens part 120 and the positioning part 116 having a protruding shape of the lens housing part 113B fit together. In this way, alignment in the rotation direction can be easily performed.

Modified Example

In the eighth embodiment, the positioning part 126 of the lens part 120 has a recessed shape, and the positioning part 116 of the lens housing part 113B has a protruding shape, but a relationship of the recession and the protrusion may be opposite. In other words, a positioning part of the lens part 120 may have a protruding shape, and a positioning part of the lens housing part 113B may have a recessed shape. Each of the positioning parts may include a plurality of positioning parts.

Figure 17B:
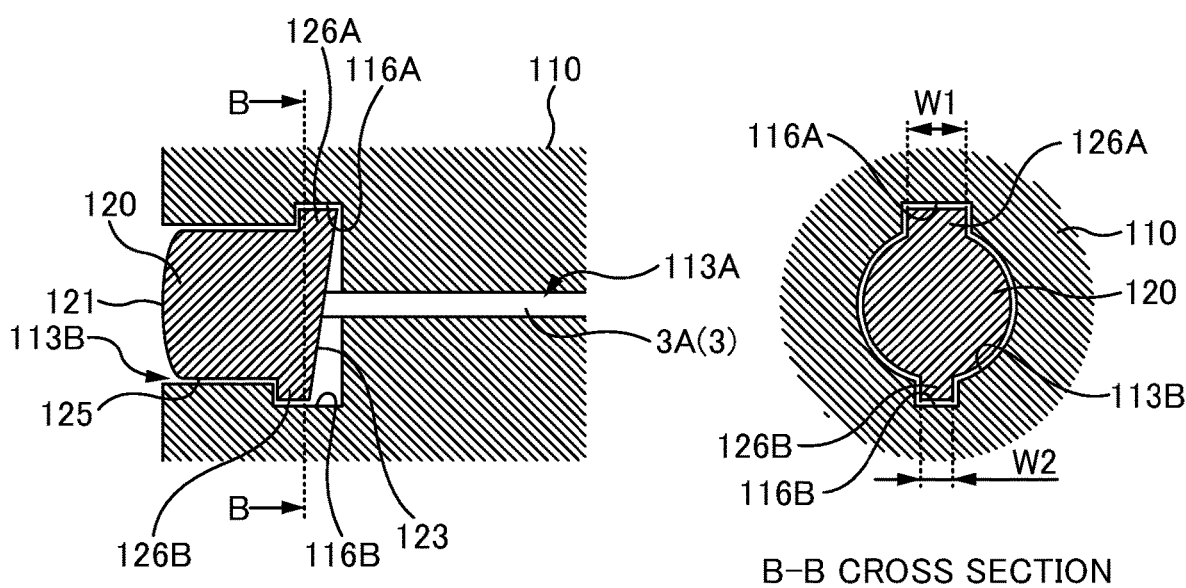
FIG. 17B is an explanatory view of a modified example of the eighth embodiment.

FIG. 17B is an explanatory view of a modified example of the eighth embodiment. In the modified example, two protruding positioning parts (a first positioning part 126A and a second positioning part 126B) are provided on the lens part 120.

The first positioning part 126A is provided on a part (on an upper side in the diagram) of the side surface 125 of the lens part 120. A width of the first positioning part 126A in the left-right direction is W1.

The second positioning part 126B is provided on a part (on a lower side in the diagram) of the side surface 125 of the lens part 120 opposite to the first positioning part 126A. A width of the second positioning part 126B in the left-right direction is W2 (<W1). In other words, the second positioning part 126B has a width smaller than a width of the first positioning part 126A.

In the modified example, two recessed positioning parts (a first positioning part 116A and a second positioning part 116B) are provided in the lens housing part 113B.

The first positioning part 116A is provided in a shape that corresponds to (fits) the first positioning part 126A of the lens part 120 on the upper side of the lens housing part 113B.

The second positioning part 116B is provided in a shape that corresponds to (fits) the second positioning part 126B of the lens part 120 on the lower side of the lens housing part 113B. In other words, the second positioning part 116B has a width smaller than a width of the first positioning part 116A.

Then, when the lens part 120 is inserted into the lens housing part 113B, the first positioning part 126A of the lens part 120 is aligned with the first positioning part 116A of the lens housing part 113B, and the second positioning part 126B of the lens part 120 is aligned with the second positioning part 116B of the lens housing part 113B. In this way, alignment of the lens part 120 in the rotation direction can be performed, and a mistake in an attachment direction can also be prevented.

In such a manner, in the modified example, a relationship of the recession and the protrusion of the positioning parts is opposite as compared to the eighth embodiment. Also in this case, alignment in the rotation direction can be similarly performed. In the modified example, the two positioning parts are provided in each of the lens part 120 and the lens housing part 113B, and widths (W1 and W2) of the positioning parts are set different on the lens part 120 side and the lens housing part 113B side. In this way, a mistake in the attachment direction can be prevented. Note that widths of the positioning parts are set different in this modified example, but the present disclosure is not limited thereto. For example, heights of the positioning parts may be set different from each other. Also in this case, a mistake in the attachment direction can be similarly prevented. The number of the positioning parts of the lens part 120 (the number of the positioning parts of the lens housing part 113B) may be three or more.

A recessed positioning part and a protruding positioning part may be provided in combination in each of the lens part 120 and the lens housing part 113B. For example, in FIG. 17B, the second positioning part 126B of the lens part 120 may have a recessed shape, and the second positioning part 116B of the lens housing part 113B may have a protruding shape. Also in this case, a mistake in an attachment direction can be similarly prevented.

Ninth Embodiment

Figure 18A:
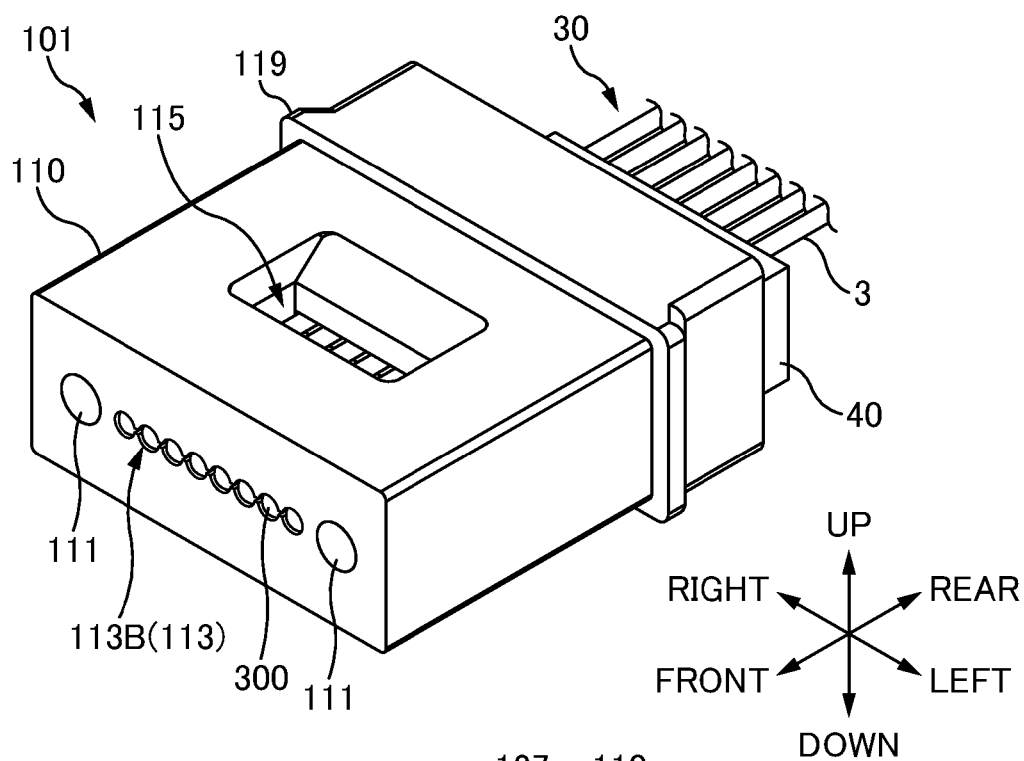
FIG. 18A is a perspective view of a ferrule structure 101 according to a ninth embodiment.
Figure 18B:
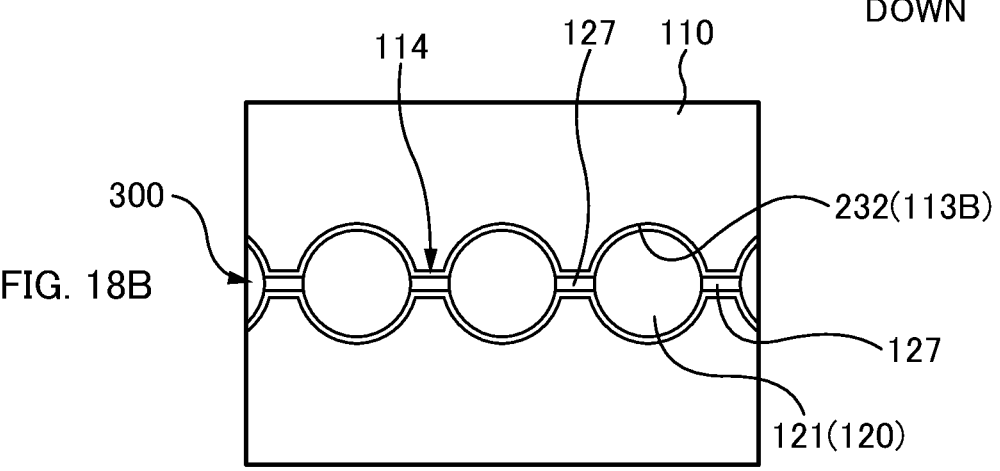
FIG. 18B is a partially enlarged view (front view) of the ferrule structure 101 according to the ninth embodiment.
Figure 18C:
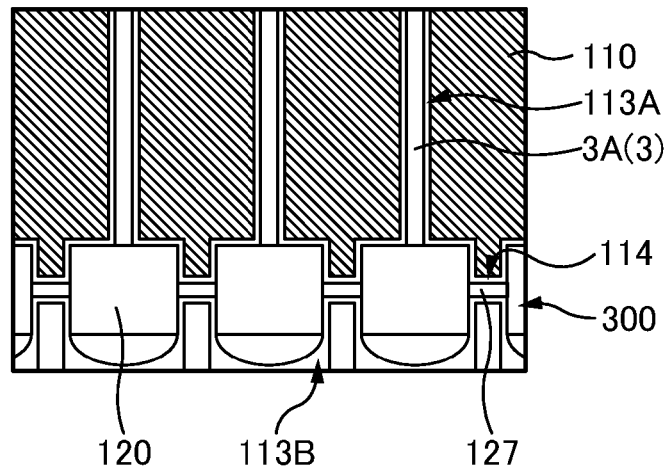
FIG. 18C is a partially enlarged cross-sectional view (diagram seen from above) of the ferrule structure 101 according to the ninth embodiment.

FIG. 18A is a perspective view of a ferrule structure 101 according to a ninth embodiment. FIG. 18B is a partially enlarged view (front view) of the ferrule structure 101 according to the ninth embodiment. FIG. 18C is a partially enlarged cross-sectional view (diagram seen from above) of the ferrule structure 101 according to the ninth embodiment.

The ferrule structure 101 according to the present embodiment includes a lens unit 300.

The lens unit 300 includes a plurality of lens parts 120 and a plurality of coupling parts 127, and is integrally molded from a transparent resin. A configuration of the lens part 120 is the same as that in the aforementioned embodiments (for example, the lens part 120 in the fifth embodiment), and thus description will be omitted.

The coupling part 127 is provided between the lens parts 120 adjacent to each other (more specifically, side surfaces 125 of the lens parts 120), and couples the lens parts 120 to each other. The plurality of lens parts 120 of the lens unit 300 are coupled linearly (here, linearly along the left-right direction) by the plurality of coupling parts 127. Thus, in the lens unit 300, the number of the coupling parts 127 is smaller than the number of the lens parts 120 by one.

The lens parts 120 adjacent to each other are coupled by the coupling part 127, and thus handling of multitude of (here, eight) the lens parts 120 is easy. The coupling part 127 has a function as a positioning part in the rotation direction. In other words, by attaching the lens unit 300 (the plurality of lens parts 120) to a ferrule 110 (a plurality of lens housing parts 113B), alignment in the rotation direction is performed on each of the plurality of lens parts 120. Furthermore, the lens unit 300 also has a function of absorbing a deformation amount by the coupling part 127 when a temperature environment changes, and maintaining a positional relationship between the lens part 120 and an optical fiber 3.

The ferrule 110 according to the present embodiment includes a groove part 114. The groove part 114 is provided between the lens housing parts 113B adjacent to each other (between the lens housing part 113B and the lens housing part 113B). The groove part 114 is a section for arranging the coupling part 127. In one or more embodiments, the groove part 114 and the coupling part 127 are not fixed therebetween. The reason is that, when a temperature environment changes, the coupling part 127 expands and contracts to absorb a deformation amount by the coupling part 127. A bottom surface of the groove part 114 is arranged closer to the front side than a bottom surface 231 of the lens housing part 113B. In this way, adhesion, to the groove part 114, of an adhesive applied to the lens housing part 113B can be suppressed.

In such a manner, in the ninth embodiment, the lens unit 300 in which the lens parts 120 adjacent to each other are coupled to each other by the coupling part 127 is used. The groove part 114 for arranging the coupling part 127 is provided between the lens housing parts 113B adjacent to each other of the ferrule 110. In this way, handling of the multitude of the lens parts 120 is easy, and alignment in the rotation direction is easy.

Also in the present embodiment, when each of fiber holes 113A and the lens housing part 113B on the front side of each of the fiber holes 113A are formed with predetermined position precision, position precision between an end face of the optical fiber 3 inserted in the fiber hole 113A and the lens part 120 housed in the lens housing part 113B can be secured. Thus, highly precise alignment between the plurality of optical fibers 3 and the plurality of lens parts 120 can be achieved with a simple structure. Note that, even if an interval between the lens parts 120 of the lens unit 300 is slightly different with respect to an interval between the lens housing parts 113B, the interval between the lens parts 120 of the lens unit 300 is adjusted to the interval between the lens housing parts 113B by the coupling part 127 is deformed when the lens part 120 is housed in the lens housing part 113B. Thus, highly precise alignment between the optical fiber 3 and the lens part 120 can be achieved.

Other Embodiment

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

REFERENCE SIGNS LIST

1: Ferrule structure;
3: Optical fiber;
3A: Bare optical fiber;
3B: Sheath part;
10: Ferrule;
11: Guide hole;
12: Recessed part;
13: Unit hole;
13A: Front hole;
13B: Rear hole;
13C: Step part;
13D: Reference plane;
15: Filling part;
17: Boot hole;
19: Flange part;
20: Lens unit;
21: Body part;
21A: Lens part;
23: Flange part;
23D: Reference plane;
25: Fiber hole;
25A: Abutment part;
25B: Tapered surface;
26: Guide groove;
27: Air hole;
30: Optical fiber ribbon;
40: Boot;
50: Die;
51: Chamber;
101: Ferrule structure;
110: Ferrule;
111: Guide hole;
112: Recessed part;
113: Through hole;
113A: Fiber hole;
113B: Lens housing part;
114: Groove part;
115: Filling part;
116: Positioning part;
116A: First positioning part;
116B: Second positioning part;
117: Boot hole;
119: Flange part;
120: Lens part;
121: Lens surface;
123: Abutment part;
123A: Recessed part;
125: Side surface;
126: Positioning part;
126A: First positioning part;
126B: Second positioning part;
127: Coupling part;
231: Bottom surface;
232: Side surface;
300: Lens unit.

The invention claimed is:

1. A ferrule structure comprising:
   lens units each attached to an end part of a respective optical fiber, wherein a sheath of the optical fiber has been removed at the end part; and
   a ferrule that:
      comprises unit holes into which the lens units are inserted, and
      optically connects the optical fiber with another optical component,
   wherein each of the lens units comprises:
      a lens part molded from a resin that transmits an optical signal;
      an abutment part that abuts against an end face of the optical fiber,
      a fiber hole that aligns the optical fiber with the lens part when the end part of the optical fiber is inserted and fixed in the fiber hole, and
      a flange part having a diameter greater than a diameter of the unit holes of the ferrule,
   wherein the ferrule further comprises a step part that contacts the flange part of each of the lens units and aligns the ferrule and the lens units.

2. The ferrule structure according to claim 1, wherein the lens part comprises a tip inside one of the unit holes.

3. The ferrule structure according to claim 1, wherein each of the unit holes and each of the flange parts comprises a positioning part that aligns in a rotation direction about an optical axis of the optical fibers.

4. The ferrule structure according to claim 3, wherein an end face of the optical fiber is inclined with respect to a plane perpendicular to the optical axis.

5. The ferrule structure according to claim 4, wherein the abutment part is inclined with respect to the plane perpendicular to the optical axis.

6. The ferrule structure according to claim 1, wherein each of the lens units is inserted into a corresponding one of the unit holes.

7. A method for manufacturing a ferrule structure, the method comprising:
   forming unit holes on a ferrule that optically connects a respective optical fiber with another optical component, each of the unit holes comprising a step part;
   molding lens units from a resin that transmits an optical signal, wherein each of the lens units comprises:
      a lens part;
      a fiber hole comprising an abutment part; and
      a flange part having a diameter greater than a diameter of the unit holes;
   attaching the lens units to an end part of the optical fiber by:
      inserting an end part of the optical fiber into the fiber hole, wherein a sheath of the optical fiber has been removed at the end part,
      aligning the optical fiber with the lens part by abutting an end face of the optical fiber against the abutment part, and
      fixing the optical fiber in the fiber hole; and
   fixing each of the lens units by:
      inserting each of the lens units attached to the optical fiber into one of the unit holes of the ferrule, and
      aligning the ferrule and the lens units by contacting the flange part with the step part.

* * * * *